US011822212B2

United States Patent
Han et al.

(10) Patent No.: US 11,822,212 B2
(45) Date of Patent: Nov. 21, 2023

(54) LENS DRIVING DEVICE AND CAMERA MODULE INCLUDING SAME

(71) Applicant: LG INNOTEK CO., LTD., Seoul (KR)

(72) Inventors: Sang Yeon Han, Seoul (KR); Do Yun Kim, Seoul (KR); Jung Hwan Kim, Seoul (KR); Yong Nam Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/646,123

(22) Filed: Dec. 27, 2021

(65) Prior Publication Data

US 2022/0197114 A1 Jun. 23, 2022

Related U.S. Application Data

(63) Continuation of application No. 15/773,459, filed as application No. PCT/KR2016/012508 on Nov. 2, 2016, now abandoned.

(30) Foreign Application Priority Data

Nov. 4, 2015 (KR) .......... 10-2015-0154438
Dec. 8, 2015 (KR) .......... 10-2015-0173871

(Continued)

(51) Int. Cl.
  *G03B 13/36* (2021.01)
  *G02B 7/09* (2021.01)
  (Continued)

(52) U.S. Cl.
  CPC ............ *G03B 13/36* (2013.01); *G02B 7/09* (2013.01); *G02B 27/64* (2013.01); *G03B 3/10* (2013.01);
  (Continued)

(58) Field of Classification Search
  CPC ........ G02B 27/64; G02B 27/646; G02B 7/08; G02B 7/09; G03B 13/36; G03B 17/02;
  (Continued)

(56) References Cited

U.S. PATENT DOCUMENTS

2010/0110270 A1  5/2010 Sekimoto et al.
2011/0141338 A1  6/2011 Lee et al.
(Continued)

FOREIGN PATENT DOCUMENTS

CN   101995637 A   3/2011
CN   102207602 A   10/2011
(Continued)

OTHER PUBLICATIONS

Office Action dated Jul. 20, 2022 in Chinese Application No. 202110367854.3.
(Continued)

*Primary Examiner* — Antoinette T Spinks
(74) *Attorney, Agent, or Firm* — Saliwanchik, Lloyd & Eisenschenk

(57) ABSTRACT

One embodiment of a camera module comprises: a lens barrel including at least one lens; a bobbin for accommodating the lens barrel; and a fixing part disposed between the lens barrel and the bobbin so as to inhibit the lens barrel from being separated from the bobbin, wherein one surface, which makes surface contact with the fixing part, of the bobbin can include a bobbin provided so as to protrude toward the lens barrel.

20 Claims, 22 Drawing Sheets

(30) Foreign Application Priority Data

Dec. 24, 2015 (KR) ........................ 10-2015-0185861
Jan. 15, 2016 (KR) ........................ 10-2016-0005167

(51) Int. Cl.
| | | |
|---|---|---|
| G02B 27/64 | (2006.01) | |
| G03B 43/00 | (2021.01) | |
| G03B 3/10 | (2021.01) | |
| H02K 33/02 | (2006.01) | |
| G03B 17/02 | (2021.01) | |
| H04N 23/00 | (2023.01) | |
| H04N 23/55 | (2023.01) | |

(52) U.S. Cl.
CPC ............ *G03B 17/02* (2013.01); *G03B 43/00* (2013.01); *H02K 33/02* (2013.01); *H04N 23/00* (2023.01); *H04N 23/55* (2023.01)

(58) Field of Classification Search
CPC .. G03B 2205/0069; G03B 3/10; G03B 30/00; G03B 43/00; H02K 33/02; H02K 41/0356; H04N 23/00; H04N 23/54; H04N 23/55
See application file for complete search history.

(56) References Cited

U.S. PATENT DOCUMENTS

| | | |
|---|---|---|
| 2013/0128108 A1 | 5/2013 | Oh et al. |
| 2015/0077840 A1 | 3/2015 | Kim et al. |
| 2015/0229843 A1 | 8/2015 | Shimizu |

FOREIGN PATENT DOCUMENTS

| | | |
|---|---|---|
| CN | 103959760 A | 7/2014 |
| CN | 104698721 A | 6/2015 |
| CN | 104808416 A | 7/2015 |
| CN | 104902149 A | 9/2015 |
| CN | 104935792 A | 9/2015 |
| EP | 3 029 520 A1 | 6/2016 |
| EP | 3 032 326 A1 | 6/2016 |
| JP | 2010-98449 A | 4/2010 |
| KR | 10-0801642 B1 | 2/2008 |
| KR | 10-0835627 B1 | 6/2008 |
| KR | 10-2009-0105588 A | 10/2009 |
| KR | 10-2010-0125557 A | 12/2010 |
| KR | 10-2011-0024878 A | 3/2011 |
| KR | 10-2013-0073380 A | 7/2013 |
| KR | 10-2014-0077312 A | 6/2014 |
| KR | 10-2015-0000181 A | 1/2015 |
| KR | 10-2015-0006785 A | 1/2015 |
| KR | 10-2015-0014102 A | 2/2015 |
| KR | 10-2015-0054719 A | 5/2015 |
| KR | 10-2015-0066700 A | 6/2015 |
| KR | 10-2015-0089648 A | 8/2015 |
| KR | 10-2015-0104388 A | 9/2015 |
| KR | 10-2015-0115504 A | 10/2015 |
| KR | 10-2015-0123004 A | 11/2015 |
| KR | 20150123004 A1 * | 11/2015 |
| KR | 10-2016-0019209 A | 2/2016 |
| WO | 2013/081339 A1 | 6/2013 |
| WO | 2015/016586 A1 | 2/2015 |
| WO | 2015/020000 A1 | 2/2015 |
| WO | 2015/020003 A1 | 2/2015 |

OTHER PUBLICATIONS

Office Action dated Apr. 20, 2022 in Korean Application No. 10-2016-0005167.
International Search Report in International Application No. PCT/KR2016/012508, filed Nov. 2, 2016.
Supplementary European Search Report dated Sep. 7, 2018 in European Application No. 16862409.6.
Office Action dated Mar. 30, 2020 in Chinese Application No. 201680071450.7.
European Search Report dated Nov. 19, 2020 in European Application No. 20187462.5.
Office Action dated Sep. 1, 2021 in Korean Application No. 10-2015-0173871.
Office Action dated Mar. 21, 2019 in U.S. Appl. No. 15/773,459.
Office Action dated Nov. 27, 2019 in U.S. Appl. No. 15/773,459.
Office Action dated May 12, 2020 in U.S. Appl. No. 15/773,459.
Office Action dated Nov. 5, 2020 in U.S. Appl. No. 15/773,459.
Office Action dated Mar. 25, 2021 in U.S. Appl. No. 15/773,459.
Office Action dated Sep. 27, 2021 in U.S. Appl. No. 15/773,459.
Office Action dated Jul. 20, 2022 in Chinese Application No. 202110366533.1.
Office Action dated Sep. 5, 2022 in Chinese Application No. 202110367844.X.
Office Action dated Sep. 14, 2022 in Korean Application No. 10-2015-0154438.
Office Action dated Dec. 24, 2021 in Korean Application No. 10-2015-0185861.
European Search Report dated Dec. 22, 2022 in European Application No. 22191741.2.

* cited by examiner

FIG.8
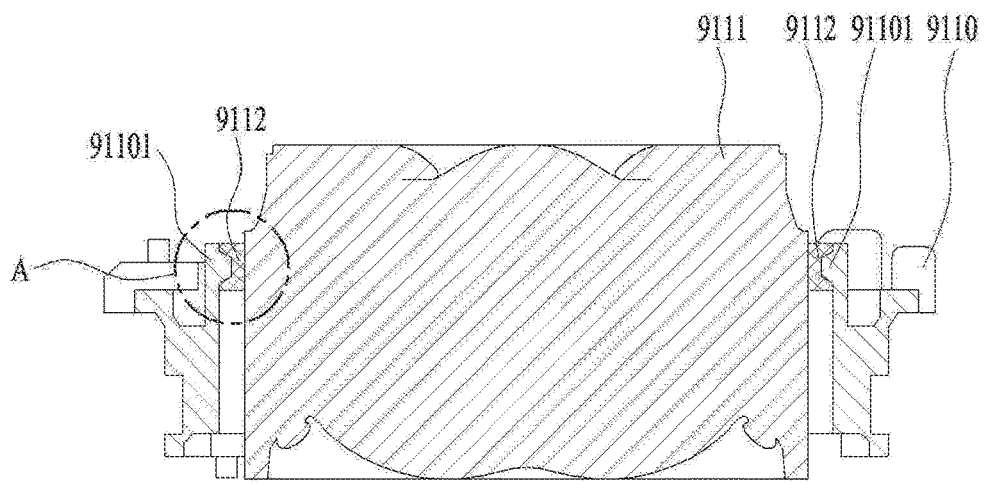
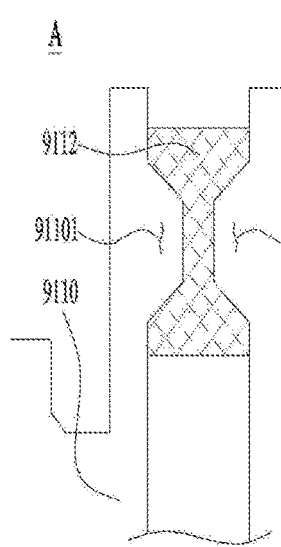
FIG. 9A
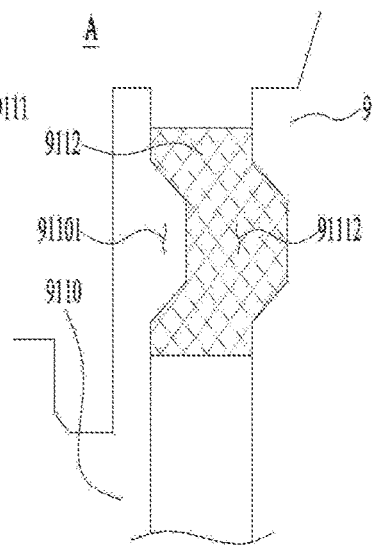
FIG. 9B
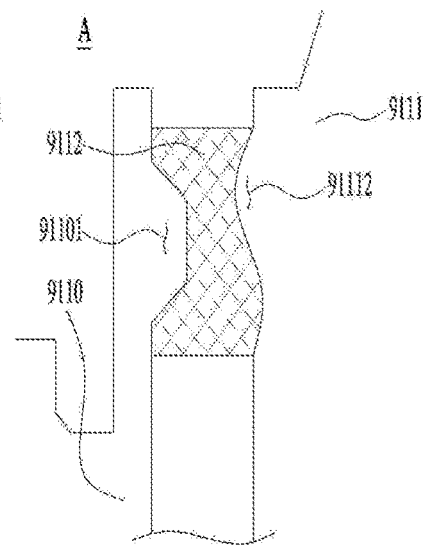
FIG. 9C

FIG.21
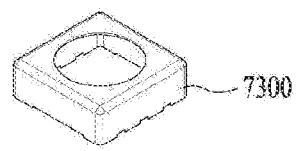
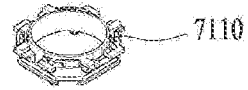
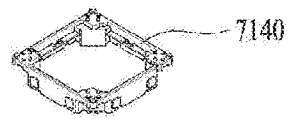
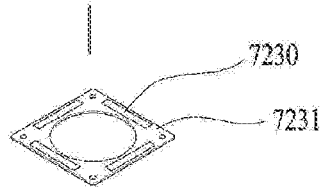
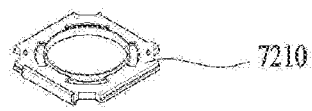

LENS DRIVING DEVICE AND CAMERA MODULE INCLUDING SAME

CROSS-REFERENCE TO RELATED APPLICATIONS

This application is a continuation of U.S. application Ser. No. 15/773,459, filed May 3, 2018; which is the U.S. national stage application of International Patent Application No. PCT/KR2016/012508, filed Nov. 2, 2016, which claims priority to Korean Application Nos. 10-2015-0154438, filed Nov. 4, 2015; 10-2015-0173871, filed Dec. 8, 2015; 10-2015-0185861, filed Dec. 24, 2015; and 10-2016-0005167, filed Jan. 15, 2016, the disclosures of each of which are incorporated herein by reference in their entirety.

TECHNICAL FIELD

Embodiments relate to a lens driving device and a camera module including the same.

BACKGROUND ART

The disclosure described in this part merely provides background information related to embodiments, and does not constitute the related art.

Recently, IT products, such as cellular phones, smartphones, table PCs, and laptop computers, equipped with subminiature digital cameras, have been actively developed.

In the case of a camera module mounted in a small-sized electronic product such as a smartphone, the camera module may frequently receive shocks during use, and may shake minutely due to, for example, shaking of the user's hand. In consideration of this, development of technology in which a hand-tremor compensation device is additionally provided to the camera module has recently been required.

In order to inhibit a camera module from shaking minutely due to, for example, shaking of the user's hand during image capturing, an optical module including at least one lens sheet may be moved in a plane, which is defined by second and third directions orthogonal to a first direction that is parallel to an optical axis.

To this end, the camera module may include a circuit member, which includes a printed circuit board and at least one second coil provided on the printed circuit board to provide the force required to move the optical module in the second and third directions.

A lens driving device needs to pass a predetermined standardized shock test once it has been manufactured. The standardized shock test is generally a test in which, for example, in the state in which a lens driving device is fixed on a shock tester table, after shock waves, namely, sine half-waves are applied three times in two directions orthogonal to each other about the Z-axis at a maximum shock acceleration of 500 m/s$^2$ for a shock duration time of 11 ms, it is checked whether the external appearance of the lens driving device has notable abnormalities, or whether variation in the specification of the lens driving device, compared to initial values, is within a predetermined range.

In this case, a lens barrel of the lens driving device may be separated from a bobbin, which accommodates the lens barrel therein, or may be misaligned.

During the shock test, as described above, when the lens barrel is separated from the bobbin or when the lens barrel is tilted at a predetermined angle, the resolution of a camera module may be reduced.

In the case of a lens driving device and a camera module including the same, which are mounted in a small-sized electronic product such as a smartphone, an auto-focusing device may be mounted therein. Specifically, in order to realize auto-focusing, a bobbin may be mounted in the lens driving device to move a lens in an optical-axis direction.

In addition, a lens barrel having a lens may be provided in the bobbin. The lens barrel may be coupled to the bobbin by adhesion. Meanwhile, when external shocks are applied to the lens driving device and the camera module, the coupling of the lens barrel and the bobbin is broken, so that the lens barrel may move arbitrarily relative to the bobbin.

When the lens barrel moves arbitrarily relative to the bobbin, the lens driving device may not accurately perform a function thereof such as auto-focusing. Therefore, the quality of an image captured by the camera module may be reduced.

The camera module, mounted in the small-sized electronic product such as a smartphone, may include, for example, the lens driving device and a holder coupled thereto.

The lens driving device may include at least one lens, and may further include an auto-focusing device, which focuses the lens in an optical-axis direction, and a hand-tremor compensation device, which inhibits deterioration in the quality of an image due to shaking of the user's hand.

The holder, which is coupled to the lens driving device, may include, for example, a sensor holder, on which an image sensor is mounted so that an image of a subject is formed thereon, and a filter holder, on which a filter is mounted to filter light within a specific wavelength range, among the light incident on the image sensor.

In the case in which the lens driving device is coupled to the holder by adhesion, when external force is applied to the lens driving device and the holder in different directions, shear force may be applied to the adhered portion of the lens driving device and the holder.

When the shear force is repeatedly and continuously applied to the adhered portion, the adhered portion may be damaged, and in the worst case, the adhered portion may be broken, causing separation of the lens driving device and the holder.

The lens driving device of the camera module is bonded to an image sensor board using an adhesive containing epoxy.

In order to align the optical axis of light incident on the lens driving device with the optical axis of the image sensor mounted on the image sensor board, when the lens driving device and the image sensor board are bonded to each other using the adhesive, a process of aligning the lens driving device and the image sensor board with each other is performed, and thereafter, the mutual bonding of the lens driving device and the image sensor board is performed.

However, conventionally, when the lens driving device and the image sensor board are coupled to each other, it is difficult to handle a flexible circuit board, which protrudes from the lens driving device and is connected to the image sensor board, which causes errors in assembly of the flexible circuit board and the image sensor board and increases the assembly time.

In addition, when facing portions of the lens driving device and the image sensor board, which are adhered to each other, are brought into contact with each other by, for example, a reliability test, this may greatly deteriorate the performance of the camera module.

In addition, due to a narrow adhesion area of the adhesive disposed between the image sensor board and the lens driving device, the lens driving device and the image sensor board may be easily separated from each other by external shocks.

DISCLOSURE

Technical Problem

Embodiments provide a lens driving device in which a fixing part is provided between a lens barrel and a bobbin to inhibit the lens barrel from being separated from the bobbin or from tilting during a shock test, and a camera module including the same.

In addition, embodiments provide a lens driving device, which inhibits a lens barrel from being separated from a bobbin or from tilting during a shock test, thereby inhibiting deterioration in the resolution of a camera module, and a camera module including the same.

In addition, embodiments provide a lens driving device having a structure that increases the coupling force of a bobbin and a lens barrel, and a camera module including the same.

In addition, embodiments provide a camera module having a firm structure that exerts a high shear strength even when external force is applied thereto.

In addition, embodiments provide a camera module in which a flexible circuit board, which protrudes from a lens driving device and is connected to an image sensor board, is supported when the lens driving device and the image sensor board are coupled to each other, which inhibits errors in the assembly of the flexible circuit board and the image sensor board and reduces the assembly time.

In addition, embodiments provide a camera module, which inhibits great deterioration in performance caused when facing portions of an image sensor board and a lens driving device, which have been bonded to each other, are brought into contact with each other by a reliability test or the like.

In addition, embodiments provide a camera module in which a lens driving device and an image sensor board are inhibited from being easily separated from each other by external shocks due to a narrow adhesion area of an adhesive disposed between the image sensor board and the lens driving device.

The technical objects acquired by the embodiments are not limited to the technical objects mentioned above, and other unmentioned technical objects will be clearly understood by those skilled in the art from the following description.

Technical Solution

In one embodiment, a camera module includes a lens barrel including at least one lens, a bobbin configured to accommodate the lens barrel therein, and a fixing part disposed between the lens barrel and the bobbin to inhibit the lens barrel from being separated from the bobbin, wherein one surface of the bobbin, which is in surface contact with the fixing part, includes a bobbin rib provided so as to protrude toward the lens barrel.

In another embodiment, a camera module includes a lens barrel including at least one lens, a bobbin configured to accommodate the lens barrel therein, and a fixing part disposed between the lens barrel and the bobbin to inhibit the lens barrel from being separated from the bobbin, wherein one surface of the bobbin, which is in surface contact with the fixing part, includes a bobbin rib provided so as to protrude toward the lens barrel, and wherein one surface of the lens barrel, which is in surface contact with the fixing part, includes a lens barrel rib, which is provided so as to protrude, or a lens barrel recess, which is provided so as to be indented.

In a further embodiment, a camera module includes a lens barrel including at least one lens, a bobbin configured to accommodate the lens barrel therein, a fixing part disposed between the lens barrel and the bobbin to inhibit the lens barrel from being separated from the bobbin, a first coil provided on an outer peripheral surface of the bobbin, a first magnet disposed so as to face the first coil, a housing configured to support the first magnet, upper and lower elastic members coupled to the bobbin and the housing, a base disposed below the bobbin, a plurality of support members configured to support the housing so as to be movable in second and third directions, which are orthogonal to a first direction, relative to the base, and a printed circuit board seated on the base, wherein one surface of the bobbin, which is in surface contact with the fixing part, includes a bobbin rib provided so as to protrude toward the lens barrel.

Advantageous Effects

A lens driving device and a camera module including the same according to embodiments may include a fixing part provided between a lens barrel and a bobbin, thereby being capable of inhibiting the lens barrel from being separated from the bobbin or from tilting during a shock test.

In addition, by inhibiting the lens barrel from being separated from the bobbin or from tilting during a shock test, it is possible to inhibit deterioration in the resolution of a camera module.

In the embodiments, by coupling the bobbin and the lens barrel to each other using a coupling protrusion and a coupling recess, it is possible to maintain the bobbin and the lens barrel in the mutually coupled state even when an adhesive, which bonds the bobbin and the lens barrel to each other, is detached by external shocks.

In addition, since the area in which the adhesive is adhered to the bobbin and the lens barrel may be increased, it is possible to increase the coupling force of the bobbin and the lens barrel by the adhesive.

In addition, since a portion, onto which the adhesive is applied, has a stepped shape to greatly reduce the formation of a gap, it is possible to remarkably reduce the amount of adhesive that moves into the lens driving device through the gap, and thus to inhibit an image sensor and other elements from being damaged by the adhesive introduced into the lens driving device through the gap.

In addition, by limiting excessive movement of the lens barrel in a first direction due to a first distance smaller than a second distance, it is possible to inhibit or remarkably reduce deterioration in the quality of a captured image due to arbitrary uncontrolled movement of the lens barrel.

In the embodiments, through the provision of a protruding portion and an indented portion to inhibit excessive movement of the base relative to a filter holder in the x-y plane, it is possible to inhibit a coupling portion from being damaged or broken by shear force.

Accordingly, it is possible to inhibit deterioration in the quality of an image captured by the camera module, which may be caused when the base excessively moves relative to the filter holder, and to inhibit erroneous operation and operation stoppage of the camera module due to the breakage of the coupling portion.

In the embodiments, the protruding portion and the indented portion corresponding thereto are formed in an adhered portion of the filter holder and a sensor holder. As such, even when strong shear force is applied to the adhered portion of the filter holder and the sensor holder, it is possible to inhibit damage to or breakage of the adhered portion.

Accordingly, it is possible to inhibit deterioration in the quality of an image, erroneous operation, operation stoppage, or the like of the camera module due to the breakage of the adhered portion of the filter holder and the sensor holder.

In the camera module according to the embodiments, a flexible circuit board, which protrudes from the lens driving device and is connected to an image sensor board, is supported when the lens driving device and the image sensor board are coupled to each other, whereby it is possible to inhibit errors in the assembly of the flexible circuit board and the image sensor board and reduce the assembly time.

In addition, it is possible to inhibit great deterioration in the performance of the camera module caused when facing portions of the image sensor board and the lens driving device, which have been bonded to each other, are brought into contact with each other by a reliability test or the like.

DESCRIPTION OF DRAWINGS

FIG. 8 illustrates the coupling relationship of the lens barrel and the bobbin in the lens driving device according to the embodiment.

FIG. 9A through FIG. 9C illustrates various embodiments of region "A" illustrated in FIG. 8.

FIG. 15 illustrates a coupling recess according to an embodiment.

FIG. 21 is an exploded perspective view illustrating a lens driving device according to still another embodiment.

BEST MODE

Figure 1:
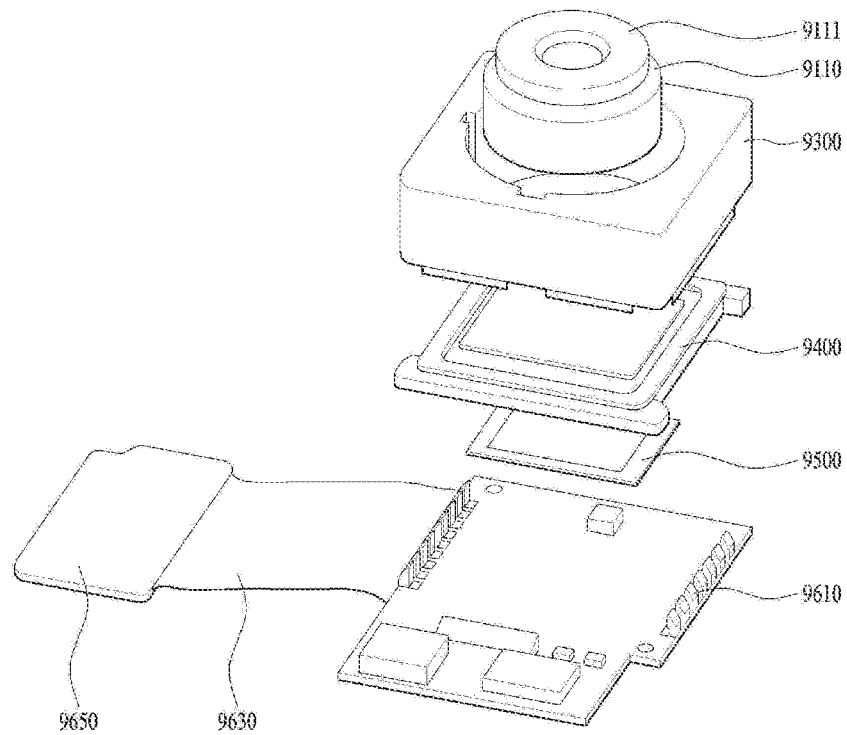
FIG. 1 is an exploded perspective view schematically illustrating a camera module according to an embodiment.

Hereinafter, embodiments will be described in detail with reference to the attached drawings. The embodiments may, however, be embodied in many alternate forms and the disclosure should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the embodiments as defined by the claims. The same reference numbers will be used throughout the drawings to refer to the same or like parts. In the drawings, dimensions of layers and regions are exaggerated for clarity of description.

In addition, in the description of the various embodiments, although terms such as, for example, "first" and "second" may be used to describe various elements, these terms are merely used to distinguish the same or similar elements from each other. Therefore, in the specification, an element modified by "first" may be the same as an element modified by "second" within the technical scope of the present invention unless otherwise mentioned.

In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. In addition, it will also be understood that the criteria of "on" or "under" is on the basis of the drawings.

In addition, relative terms such as, for example, "on/upper/above" and "beneath/lower/below", used in the following description may be used to distinguish any one substance or element with another substance or element without requiring or containing any physical or logical relationship or sequence between these substances or elements.

In addition, a Cartesian coordinate system (x, y, z) may be used in the drawings. In the drawings, an x axis and a y axis are directions perpendicular to an optical axis. For convenience, the optical-axis direction (z-axis direction) may be referred to as a 'first direction', the x-axis direction may be referred to as a 'second direction', and the y-axis direction may be referred to as a 'third direction'.

A "hand-tremor compensation device" used in a small-sized camera module mounted in a mobile device, such as a smartphone or a tablet PC, is a device configured to inhibit the outline of a captured image from being blurred due to vibration caused by the shaking of a user's hand when the image is captured.

In addition, an "auto-focusing device" is a device for automatically focusing an image of a subject on the surface of an image sensor. The hand-tremor compensation device and the auto-focusing device may be configured in various manners. A lens driving device according to the embodiments may perform a hand-tremor compensation operation and/or an auto-focusing operation with respect to a plane defined by the second and third directions, which are orthogonal to the first direction, by moving an optical module constituted by at least one lens in the first direction, which is parallel to the optical axis.

FIG. 1 is an exploded perspective view schematically illustrating a camera module according to an embodiment.

Referring to FIG. 1, the camera module according to the embodiment may include a lens barrel 9111 in which a plurality of lenses are stacked one above another, a bobbin 9110, which accommodates the lens barrel 9111 therein, a cover member 9300, which provides an accommodation space in which the bobbin 9110 is accommodated so that the bobbin 9110 is accommodated therein, a filter holder 9400, which is provided on the lower surface of the cover member 9300 and supports the lower surface of the cover member 9300, an image sensor 9500, which is disposed on one surface of the filter holder 9400 and converts light incident on the bobbin 9110 into an electrical signal, and a board unit, which provides a space in which the image sensor 9500 is disposed and transmits the electrical signal converted by the image sensor 9500 to a controller (not illustrated) and converts the same.

The filter holder 9400 may be provided between the lower surface of the cover member 9300 and the upper surface of the board unit.

More specifically, the filter holder 9400 may be adhered to the lower surface of the cover member 9300 so that the filter holder 9400 and the cover member 9300 are coupled to each other, and may be assembled so as to be seated on the upper surface of the board unit in the state in which the filter holder 9400 and the cover member 9300 are coupled.

However, this merely illustrates one embodiment, and a user may omit the folder holder 9400 and may directly couple the cover member 9300 to the board unit as needed.

The filter holder 9400 may include a filter in the center thereof.

The filter holder 9400 may be provided in a hollow shape. This serves to allow light, collected from the outside by the lens barrel 9111, to pass through the filter holder 9400 to thereby be transmitted to the image sensor 9500.

That is, the light, collected from the outside by the lens barrel 9111, passes through the central portion of the filter holder 9400. At this time, the filter may be disposed in the center of the filter holder 9400 to extract only light within a required wavelength range and transmit the same to the image sensor 9500.

In an embodiment, the filter may be an infrared (IR) cutoff filter.

The outside light collected by the lens barrel 9111 includes infrared light within a wavelength range invisible to humans. The IR cutoff filter is a member that blocks light within an infrared wavelength range in order to inhibit the image sensor 9500 from sensing the infrared light and distorting the actual color to some other color.

However, the filter in the embodiment may be a filter that blocks light within a wavelength range other than an infrared wavelength range.

The board unit may include a board base 9610, which provides one surface on which the bobbin 9110, the cover member 9300, the filter holder 9400, and the image sensor 9500 are disposed, a connector unit 9650, which transmits a signal received from the board base 9610 to the controller (not illustrated), and a connection board 9630, which has one end electrically connected to the board base 9610 and the other end electrically connected to the connector unit 9650, so as to transmit an electrical signal produced by the board base 9610 to the connector unit 9650.

The connection board 9630 may be a flexible printed circuit board (FPCB).

When the connection board 9630 is a flexible printed circuit board, the connection board is capable of freely bending unlike an existing printed circuit board. This enables more efficient utilization of a limited space.

However, this has merely been described as one embodiment, and the connection board 9630 may be a general printed circuit board, other than the flexible printed circuit board, based on the needs of the user.

Figure 2A:
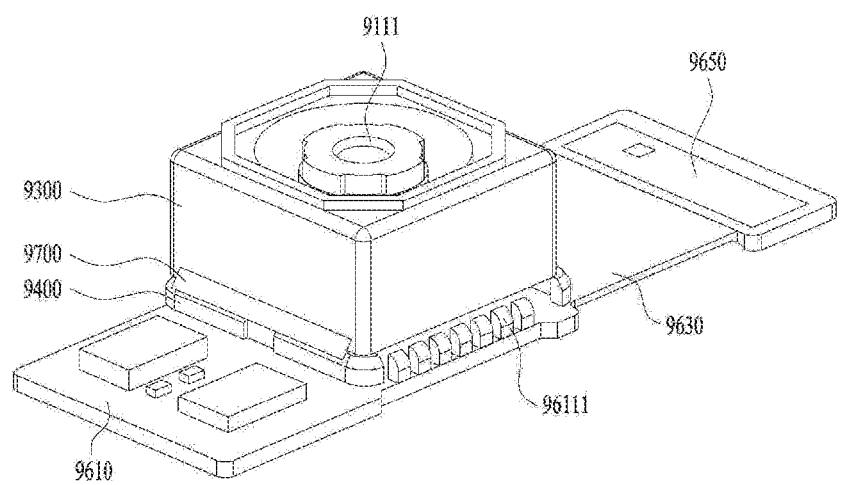
FIG. 2A and FIG. 2B illustrate the state in which a lens barrel assembly, a sensor base, and a board unit are assembled with each other according to an embodiment.
Figure 2B:
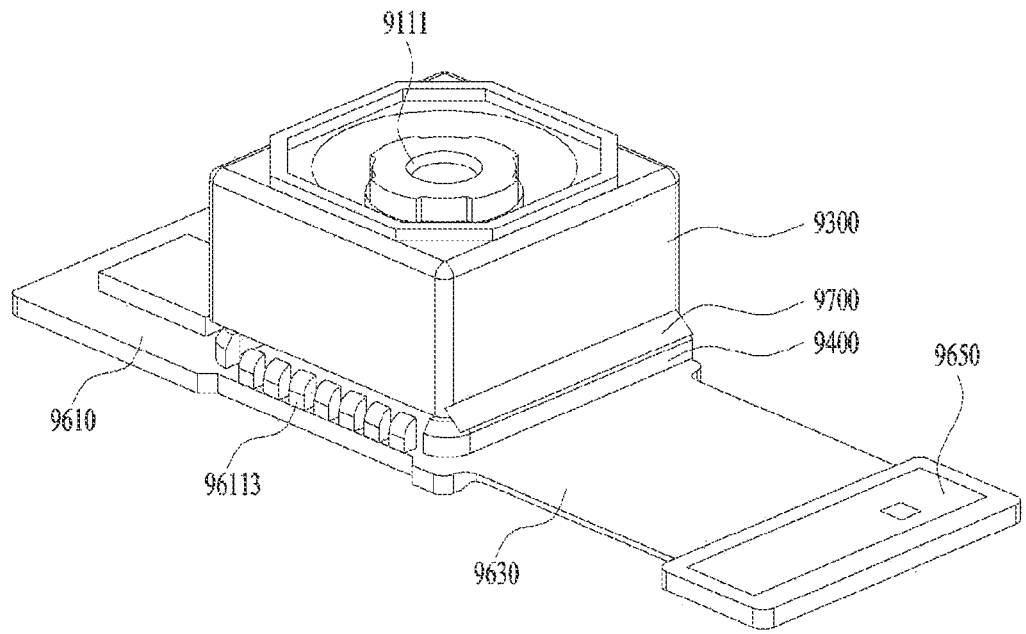

FIGS. 2A and 2B illustrate the state in which a lens barrel assembly, a sensor base, and the board unit are assembled with each other according to an embodiment.

Referring to FIGS. 2A and 2B, the filter holder 9400, the image sensor 9500, and the cover member 9300, which accommodates the bobbin 9110 therein, may be sequentially stacked on the upper surface of the board base 9610 of the board unit.

The board base 9610 may include a plurality of terminal units provided on at least one surface thereof, which is in contact with the cover member 9300, to electrically connect the board unit to the image sensor 9500.

The terminal units may include a first terminal unit 96111 provided along a first side of the lower surface of the cover member 9300 and a second terminal unit 96113 provided along a second side, which faces the first side of the lower surface of the cover member 9300.

In addition, the terminal units may include an epoxy 9700 provided on a third side, which is adjacent to the first side of the lower surface of the cover member 9300 on which the first terminal unit 96111 is disposed, and also provided on a fourth side, which faces the third side of the lower surface of the cover member 9300.

That is, the epoxy 9700 may be disposed on the lower surface of the cover member 9300, on which no terminal unit is provided. This serves to inhibit an increase in volume caused when the epoxy 9700 is disposed above the terminal units.

However, the epoxy 9700 and the terminal units may be disposed at various other positions based on the needs of the user as long as the image sensor 9500 and the board unit are electrically connected to each other via the terminal units and as long as the cover member 9300 and the filter holder 9400 are physically coupled to each other via the epoxy 9700.

Figure 3:
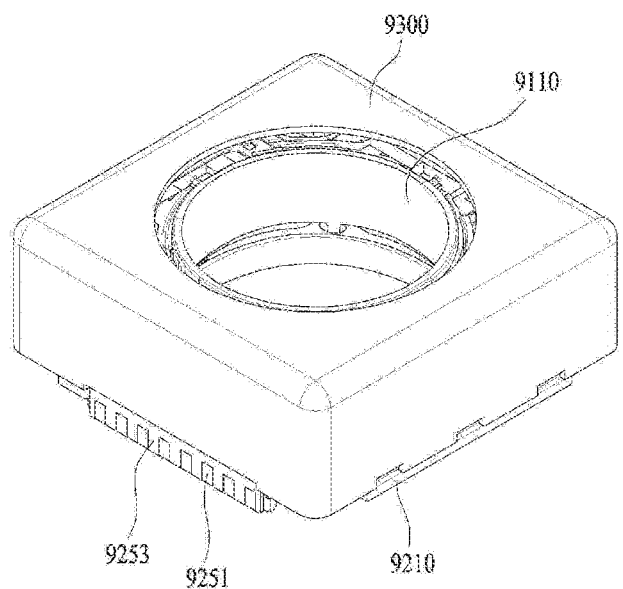
FIG. 3 is a perspective view schematically illustrating a lens driving device according to an embodiment.
Figure 4:
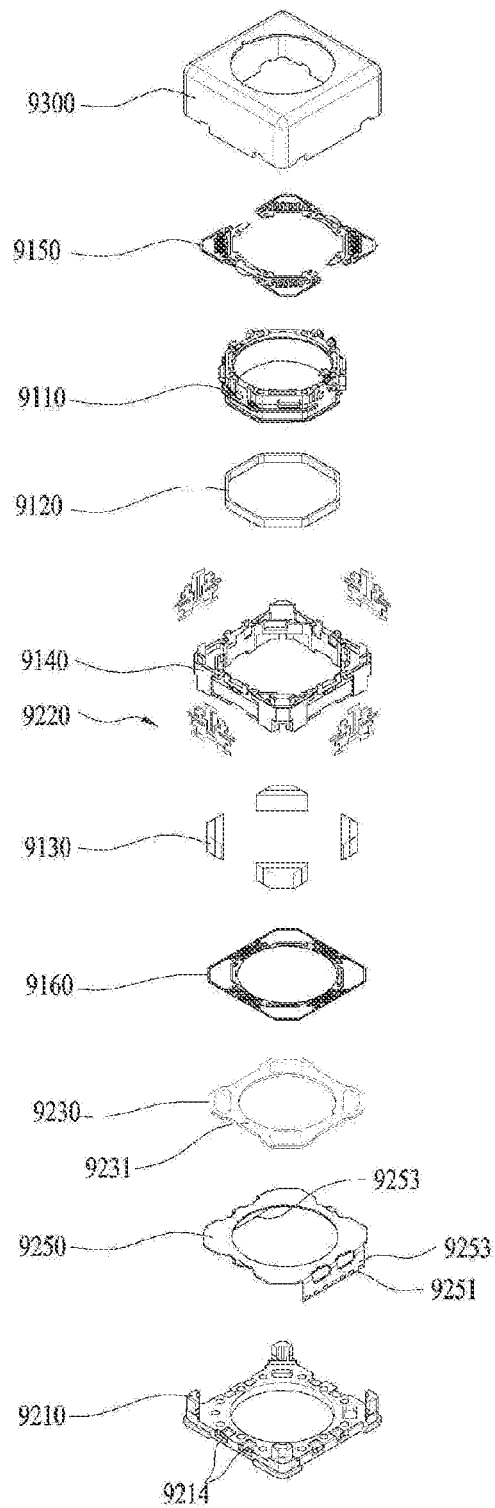
FIG. 4 is an exploded perspective view illustrating the lens driving device according to the embodiment.

FIG. 3 illustrates a schematic perspective view of a lens driving device according to an embodiment, and FIG. 4 illustrates an exploded perspective view of the lens driving device illustrated in FIG. 3.

Referring to FIG. 3, the lens driving device according to the embodiment may include a first lens driving unit, a second lens driving unit, and the cover member 9300. Here, the first lens driving unit may serve as the above-described auto-focusing device, and the second lens driving unit may serve as the above-described hand-tremor compensation device.

The cover member 9300 may have a substantially box shape, and may surround the first and second lens driving units.

As illustrated in FIG. 4, the lens driving device according to the embodiment may include a movable unit. Here, the movable unit may perform a lens auto-focusing function and a hand-tremor compensation function. The movable unit may include the bobbin 9110, a first coil 9120, a first magnet 9130, a housing 9140, an upper elastic member 9150, and a lower elastic member 9160.

The bobbin 9110 is provided on the outer peripheral surface thereof with the first coil 9120, which is disposed inside the first magnet 9130. The bobbin may be provided in the inner space of the housing 9140 so as to be reciprocatingly movable in the first direction by electromagnetic interaction between the first magnet 9130 and the first coil 9120. The first coil 9120 may be provided on the outer peripheral surface of the bobbin 9110 so as to electromagnetically interact with the first magnet 9130.

In addition, the bobbin 9110 may be elastically supported by the upper and lower elastic members 9150 and 9160, and may perform an auto-focusing function by moving in the first direction.

The bobbin 9110 may include the lens barrel 9111 in which at least one lens is provided. The lens barrel 9111 may be coupled inside the bobbin 9110 in various manners.

For example, a female screw-thread may be formed in the inner peripheral surface of the bobbin 9110 and a male screw-thread may be formed in the outer peripheral surface of the lens barrel 9111 so as to correspond to the female screw-thread, so that the lens barrel 9111 may be coupled to the bobbin 9110 via screwing. However, the disclosure is not limited thereto, and instead of forming the screw-thread in the inner peripheral surface of the bobbin 9110, the lens barrel 9111 may be directly fixed to the inner side of the bobbin 9110 by a method other than screwing. Alternatively, one or more lens sheets may be integrally formed with the bobbin 9110 without the lens barrel 9111.

One lens sheet may be coupled to the lens barrel 9111, or two or more lenses may constitute an optical system.

The auto-focusing function is controlled based on the direction of current. The auto-focusing function may be realized via movement of the bobbin 9110 in the first direction. For example, when forward current is applied, the bobbin 9110 may move upwards from the initial position thereof. When reverse current is applied, the bobbin 9110 may move downwards from the initial position thereof. Alternatively, the distance of movement in a given direction from the initial position may be increased or reduced by adjusting the amount of forward or reverse current.

The bobbin 9110 may be formed on the upper surface and the lower surface thereof with a plurality of upper support protrusions and lower support protrusions. Each of the upper support protrusions may have a cylindrical shape or a prismatic shape, and may be coupled and fixed to the upper elastic member 9150. Each of the lower support protrusions may have a cylindrical shape or a prismatic shape, similar to the upper support protrusions, and may be coupled and fixed to the lower elastic member 9160.

The upper elastic member 9150 may be provided above the bobbin 9110, and the lower elastic member 9160 may be provided below the bobbin 9110. Here, the upper elastic member 9150 may be formed with holes, which correspond to the upper support protrusions, and the lower elastic member 9160 may be formed with holes, which correspond to the lower support protrusions. The respective support protrusions and the respective holes may be fixedly coupled to each other by thermo-welding or using an adhesive member such as epoxy.

The housing 9140 may take the form of a hollow column to support the first magnet 9130, and may have a substantially square shape. The first magnet 9130 and a support member 9220 may be respectively coupled to and disposed on a side surface portion of the housing 9140.

In addition, as described above, the bobbin 9110 may be disposed within the housing 9140 so as to move in the first direction under the guidance of the elastic members 9150 and 9160. In the embodiment, the first magnet 9130 may be disposed on a corner portion of the housing 9140, and the support member 9220 may be disposed on the side surface of the housing.

The upper elastic member 9150 and the lower elastic member 9160 may elastically support upward movement and/or downward movement of the bobbin 9110 in the first direction. The upper elastic member 9150 and the lower elastic member 9160 may be leaf springs.

The upper elastic member 9150, as illustrated in FIGS. 2A and 2B, may include two members separated from each other. Through the dually divided structure, the respective divided parts of the upper elastic member 9150 may receive current having different polarities, or different voltages. In an alternative embodiment, the lower elastic member 9160 may have a dually divided structure, and the upper elastic member 9150 may have an integrated structure.

Meanwhile, the upper elastic member 9150, the lower elastic member 9160, the bobbin 9110, and the housing 9140 may be assembled by, for example, thermo-welding and/or a bonding operation using an adhesive or the like. At this time, for example, they are fixed by thermo-welding, and thereafter, the fixing may be finished by bonding using an adhesive.

A base 9210 may be disposed below the bobbin 9110, and may have a substantially square shape. A printed circuit board 9250 may be disposed on the base, and the underside of the support member 9220 may be fixed to the base. In addition, the base 9210 may be formed in the upper surface thereof with a seating recess 9214 for the support member

9220, so that the support member 9220 may be inserted into the seating recess. An adhesive may be applied to the seating recess 9214 for the support member 9220 to immovably fix the support member 9220.

The base 9210 may be formed with a support groove in a portion thereof that faces the portion of the printed circuit board 9250, on which a terminal surface 9253 is formed, the support groove having a size that corresponds to that of the terminal surface. The support groove is concavely formed to a predetermined depth from the outer peripheral surface of the base 9210, thereby inhibiting the portion, on which the terminal surface 9253 is formed, from protruding outwards, or adjusting the extent to which the portion protrudes.

The support member 9220 may be disposed on the side surface of the housing 9140, and may be coupled at the upper side thereof to the housing 9140 and coupled at the lower side thereof to the base 9210. The support member may support the bobbin 9110 and the housing 9140 so as to be movable in the second direction and the third direction, which are orthogonal to the first direction, and may be electrically connected to the first coil 9120.

Since the support member 9220 according to the embodiment is disposed on each outer side surface of the square of the housing 9140, a total of four support members may be provided in a symmetrical arrangement. However, the disclosure is not limited thereto, and a total of eight support members including two provided for each straight surface may be provided. In addition, the support member 9220 may be electrically connected to the upper elastic member 9150, or may be electrically connected to the straight surface of the upper elastic member 9150.

In addition, since the support member 9220 is formed separately from the upper elastic member 9150, the support member 9220 and the upper elastic member 9150 may be electrically connected to each other using a conductive adhesive, a solder, or the like. Thus, the upper elastic member 9150 may apply current to the first coil 9120 via the support member 9220, which is electrically connected thereto.

Meanwhile, FIG. 4 illustrates the support member 9220 having a plate shape by way of example, but the disclosure is not limited thereto. That is, the support member may have a wire shape.

A second coil 9230 may move the housing 9140 in the second direction and/or the third direction via electromagnetic interaction with the first magnet 9130, thereby being capable of performing hand-tremor compensation.

Here, the second and third directions may include not only the x-axis and y-axis directions but also the directions substantially close to the x-axis and y-axis directions. That is, the housing 9140 may move in directions parallel to the x-axis and the y-axis when viewed in terms of driving in the embodiment, but may move in directions slightly oblique to the x-axis and the y-axis when moving while being supported by the support member 9220.

In addition, it may be necessary to provide the first magnet 9130 at a position that corresponds to the second coil 9230.

The second coil 9230 may be disposed so as to face the first magnet 9130 fixed to the housing 9140. In an embodiment, the second coil 9230 may be disposed outside the first magnet 9130. Alternatively, the second coil 9230 may be downwardly spaced apart from the first magnet 9130 by a constant distance.

According to the embodiment, a total of four second coils 9230 may be provided respectively on four corner portions of a circuit member 9231, without being limited thereto. Only two second coils may be provided respectively in the second direction and in the third direction, or more than four second coils may be provided.

In the embodiment, the circuit member 9231 may be formed with a circuit pattern that takes the form of the second coil 9230, and a separate second coil may be additionally disposed above the circuit member 9231, without being limited thereto. Instead of forming the circuit pattern that takes the form of the second coil 9230, only the second coil 9230 may be separately disposed on the circuit member 9231 above the circuit member 9231.

Alternatively, the second coil 9230 may be configured by winding a wire in a doughnut shape, or may be formed to have an FP coil shape, so as to be electrically connected to the printed circuit board 9250.

The second coil 9230 may be disposed above the base 9210 and below the housing 9140. Here, the circuit member 9231 including the second coil 9230 may be provided on the upper surface of the printed circuit board 9250, which is disposed above the base 9210.

However, the disclosure is not limited thereto, and the second coil 9230 may be disposed in close contact with the base 9210 or may be spaced apart from the base by a predetermined distance. Alternatively, the second coil may be formed on a separate board so that the board is stacked on and connected to the printed circuit board 9250.

The printed circuit board 9250 may be coupled to the upper surface of the base 9210, and as illustrated in FIG. 4, may be formed with a hole or a slot at a position that corresponds to the seating recess 9214 in the support member 9220 so as to expose the seating groove.

The printed circuit board 9250 may be formed with the terminal surface 9253, which is formed by bending, so that a terminal 9251 is provided on the terminal surface. The embodiment illustrates the printed circuit board 9250 formed with two bent terminal surfaces 9253. A plurality of terminals 9251 may be disposed on each terminal surface 9253 and may supply current to the first coil 9120 and the second coil upon receiving an external voltage. The number of terminals formed on the terminal surface 9253 may be increased or reduced based on the constituent elements that need to be controlled. In addition, the printed circuit board 9250 may include one terminal surface 9253 or three or more terminal surfaces.

The cover member 9300 may have a substantially box shape, may accommodate, for example, the movable unit described above, the second coil 9230, and a portion of the printed circuit board 9250 therein, and may be coupled to the base 9210. The cover member 9300 may protect, for example, the movable unit, the second coil 9230, and the printed circuit board 9250, which are accommodated therein, and more particularly, may limit outward leakage of an electromagnetic field, which is created by, for example, the first magnet 9130, the first coil 9120, and the second coil 9230 therein, thereby enabling the electromagnetic field to be focused.

Figure 5:
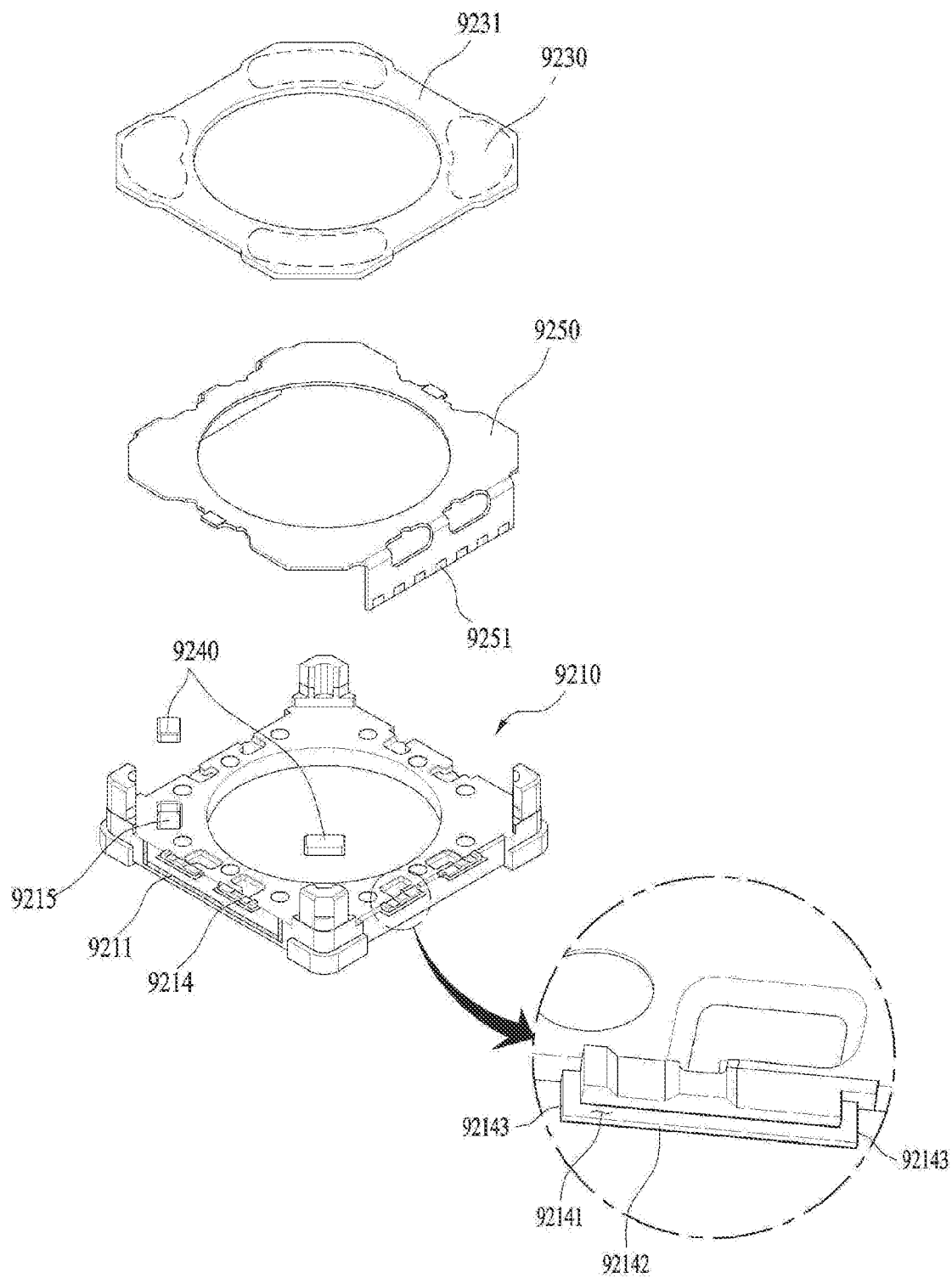
FIG. 5 illustrates a base, a printed circuit board, and a second coil according to an embodiment.

FIG. 5 is an exploded perspective view illustrating the base 9210, the printed circuit board 9250, and the second coil 9230 according to an embodiment. The lens driving device may further include a position sensor 9240.

The position sensor 9240 may be disposed at the center of the second coil 9230, and may sense movement of the housing 9140. Here, the position sensor 9240 may basically sense movement of the housing 9140 in the first direction, and in some cases, may sense movement of the housing 9140 in the second and third directions.

The position sensor 9240 may be, for example, a hall sensor, or may be any other sensor as long as it can sense variation in magnetic force. A total of two position sensors 9240 may be provided on corner portions of the base 9210, which is disposed below the printed circuit board 9250, as illustrated in FIG. 5. The mounted position sensor 9240 may be inserted into and disposed in a position-sensor seating recess 9215, which is formed in the base 9210. The lower surface of the printed circuit board 9240 may face the surface on which the second coil 9230 is disposed.

Meanwhile, the position sensor 9240 may be downwardly spaced apart from the second coil 9230 by a constant distance with the printed circuit board 9250 interposed therebetween. That is, the position sensor 9240 may not be directly connected to the second coil 9230, the second coil 9230 may be provided on the upper surface of the printed circuit board 9250, and the position sensor 9240 may be provided on the lower surface of the printed circuit board.

Meanwhile, the lens driving device according to the above-described embodiment may be used in various fields, for example, a camera module. For example, the camera module may be applied to a mobile device such as a cellular phone.

The camera module according to the embodiment may include the lens barrel 9111 coupled to the bobbin 9110 and the image sensor 9500. Here, the lens barrel 9111 may include at least one lens sheet, which transmits an image to the image sensor 9500.

In addition, the camera module may further include an infrared cutoff filter (not illustrated). The infrared cutoff filter serves to inhibit light within an infrared range from being incident on the image sensor 9500.

In this case, the infrared cutoff filter may be provided on the base 9210 illustrated in FIG. 3 at a position that corresponds to the image sensor 9500, and may be coupled to a holder member (not illustrated). In addition, the holder member may support the underside of the base 9210.

The base 9210 may be provided with a terminal member for electrical conduction with the printed circuit board 9250, and may also be integrally formed with a terminal using a surface electrode or the like.

In addition, the base may further include an adhesive member 9211 for adhering the printed circuit board 9250 to the base 9210.

The adhesive member 9211 may be provided on one side surface of the base 9210, and may be provided at a position at which one side surface of the base 9210 is in surface contact with one side surface of the printed circuit board 9250, as illustrated in the drawing.

In the present embodiment, the adhesive member 9211 is illustrated as being provided on one surface of the base 9210, but the adhesive member 9211 may further be provided on a surface that faces the surface on which the adhesive member 9211 is provided.

The adhesive member 9211 illustrated in the present embodiment is merely given by way of example, and the positions and number of adhesive members 9211 may be appropriately selected as long as the printed circuit board 9250 is adhered to the base 9210 by the adhesive members.

In order to adhere the base 9210 and the printed circuit board 9250 to each other, the adhesive member 9211 may be provided on one surface of the base 9210. When the amount of the adhesive member 9211 is small, adhesion between the base 9210 and the printed circuit board 9250 may be reduced, which causes separation of the printed circuit board 9250 from the base 9210. When the amount of the adhesive member 9211 is large, the adhesive member 9211 may enter the seating recess 9214, which makes it difficult for the support member 8220 to be accurately coupled to the seating recess 9214.

Accordingly, the seating recess 9214 in the base 9210 may further be provided with a stepped portion in order to inhibit the adhesive member 9211 from entering the seating recess 9214.

The stepped portion may include at least one side surface portion 92143, which forms the side surface of the stepped portion, a lower surface portion 92142, which forms the lower surface of the stepped portion, and a stepped space 92141, which is defined by the side surface portion 92143 and the lower surface portion 92142 and accommodates the adhesive member 9211 therein.

The cross section of the lower surface portion 92142 of the stepped space 92141 may be a flat surface shape.

In addition, the cross section of the lower surface portion 92142 of the stepped space 92141 may have a shape that is convex in the first direction, which is orthogonal to the lower surface portion 92142.

Due to the fact that the cross section of the lower surface portion 92142 of the stepped space 92141 has a shape that is convex in the first direction, which is orthogonal to the lower surface portion 92142, the adhesive member 9211 is gathered to opposite side surfaces of the lower surface portion 92142, which may more effectively inhibit the adhesive member 9211 from entering the seating recess 9214.

In addition, the cross section of the lower surface portion 92142 of the stepped space 92141 may have a shape that is concave in the first direction, which is orthogonal to the lower surface portion 92142.

Due to the fact that the cross section of the lower surface portion 92142 of the stepped space 92141 has a shape that is concave in the first direction, which is orthogonal to the lower surface portion 92142, the adhesive member 9211 is gathered to the center of the lower surface portion 92142, which may more effectively inhibit the adhesive member 9211 from entering the seating recess 9214.

In addition, the cross section of the lower surface portion 92142 of the stepped space 92141 may have a sinusoidal shape.

Due to the fact that the cross section of the lower surface portion 92142 of the stepped space 92141 has a sinusoidal shape, the adhesive member 9211 is gathered to a plurality of indentations formed in the lower surface portion 92142, which may more effectively inhibit the adhesive member 9211 from entering the seating recess 9214.

In addition, one stepped portion is provided in the present embodiment, but a plurality of stepped portions may be provided.

Since, through the provision of the plurality of stepped portions, a space capable of accommodating the adhesive member 9211 may be doubled or tripled, and therefore, it is possible to more effectively inhibit the adhesive member 9211 from entering the seating recess 9214.

The lower surface portion 92142 may further include a plurality of protruding members 2144.

The protruding members 2144 may protrude upwards from the lower surface portion 92142 by a predetermined height.

The protruding members 2144 provided on the lower surface portion 92142 may increase resistance to movement of the adhesive member 9211 introduced into the stepped portion, thereby more effectively inhibiting the adhesive member 9211 introduced into the stepped portion from entering the seating recess 9214.

The protruding members 2144 are illustrated in the drawing as having a semispherical shape, but this is merely given by way of example, and the protruding members 2144 may have a conical shape or a polygonal shape.

Meanwhile, the base 9210 may function as a sensor holder to protect the image sensor. In this case, the base 9210 may be formed with a protrusion that protrudes downwards along the side surface. However, this may not be necessary, and although not illustrated, a separate sensor holder may be disposed below the base 9210 to perform the role of the protrusion.

Figure 6:
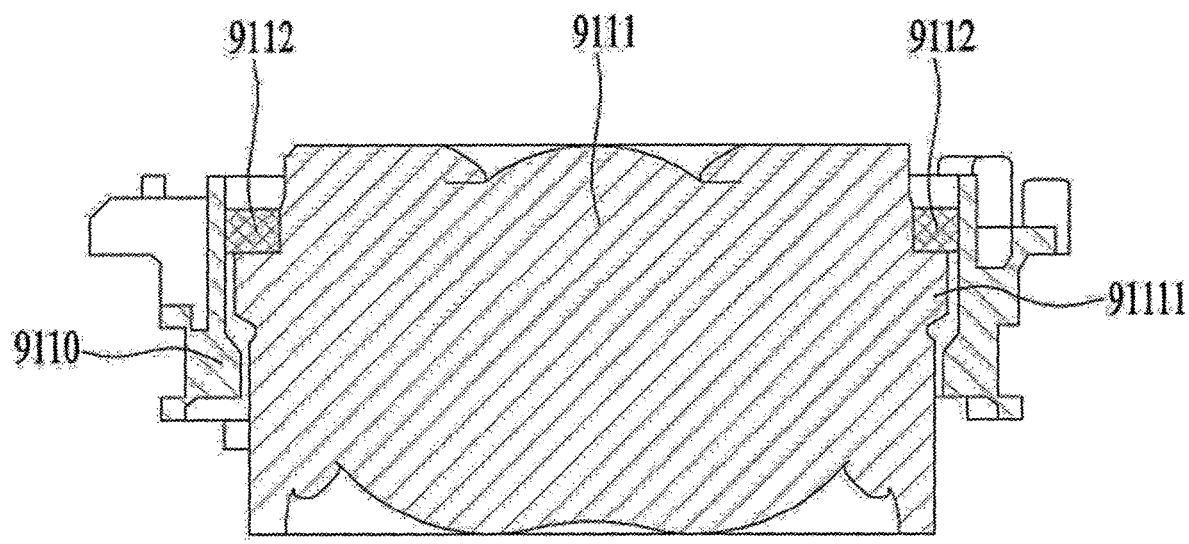
FIG. 6 illustrates the coupling relationship of a lens barrel and a bobbin in the lens driving device according to the embodiment.

FIG. 6 illustrates the coupling relationship of the lens barrel and the bobbin in the lens driving device according to the embodiment.

Referring to FIG. 6, the lens driving device of the embodiment may include the lens barrel 9111, which includes at least one lens, and the bobbin 9110, which provides a space for accommodating the lens barrel 9111 therein and has a hollow shape.

The lens barrel 9111 of the embodiment may be assembled in the height direction from the upper surface to the lower surface of the bobbin 9110.

In order to inhibit the lens barrel 9111 from being separated from the bobbin 9110 in the height direction, or to inhibit the lens barrel 9111 from tilting by a predetermined angle within the bobbin 9110, the lens driving device of the embodiment may further include a fixing part 9112 between the lens barrel 9111 and the bobbin 9110.

The fixing part 9112 may be ultraviolet (UV) curing epoxy that is cured via radiation of ultraviolet light, or may be thermosetting epoxy that is cured by radiation of heat.

The fixing part 9112 of the embodiment may be applied between the lens barrel 9111 and the bobbin 9110 in the state in which the lens barrel 9111 is accommodated within the bobbin 9110.

After the fixing part 9112 is applied between the lens barrel 9111 and the bobbin 9110, the fixing part 9112 is irradiated and cured with ultraviolet (UV) light to fix the lens barrel 9111 accommodated within the bobbin 9110, thereby inhibiting the lens barrel 9111 from being separated from the bobbin 9110 or from tilting, which may inhibit deterioration in the resolution of the camera module.

The lens barrel 9111 of the embodiment may further include a lens barrel rib 91111, which protrudes from the outer peripheral surface of the lens barrel 9111 by a predetermined height.

The upper surface of the lens barrel rib 91111 may be located lower than the lower surface of the fixing part 9112.

For example, one end surface of the fixing part 9112 may be provided so as to be in surface contact with the inner side surface of the bobbin 9110, and the other end surface of the fixing part 9112 may be provided so as to be in surface contact with the outer side surface of the lens barrel 9111. The lower surface of the fixing part 9112 may be provided so as to be in surface contact with the lens barrel rib 91111.

When the fixing part 9112 is disposed or applied between the lens barrel 9111 and the bobbin 9110, the lens barrel rib 91111 may inhibit the fixing part 9112 from deviating downwards from a preset position, thereby ensuring that the fixing part 9112 is disposed or applied at a desired position.

In the case of the lens driving device of the embodiment, in order to allow the lens barrel 9111 to be inserted into the bobbin 9110, the outer peripheral surface of the lens barrel 9111 may be spaced apart from the inner peripheral surface of the bobbin 9110 by a predetermined distance, and the fixing part 9112 may be disposed between the outer peripheral surface of the lens barrel 9111 and the inner peripheral surface of the bobbin 9110.

However, although the fixing part 9112, which is cured by ultraviolet light or heat, has predetermined adhesive force, when the lens driving device of the embodiment undergoes a shock test as described above, the lens driving device may receive shocks stronger than the force of adhesion of the fixing part 9112, and due to this, the lens barrel 9111 inserted into the bobbin 9110 may be separated from the bobbin 9110, or may tilt within the bobbin.

Hereinafter, the lens driving device, which may more effectively inhibit the lens barrel 9111 from being separated from the bobbin 9110 or from tilting within the bobbin 9110, will be described with reference to FIGS. 7 to 9C.

Figure 7:
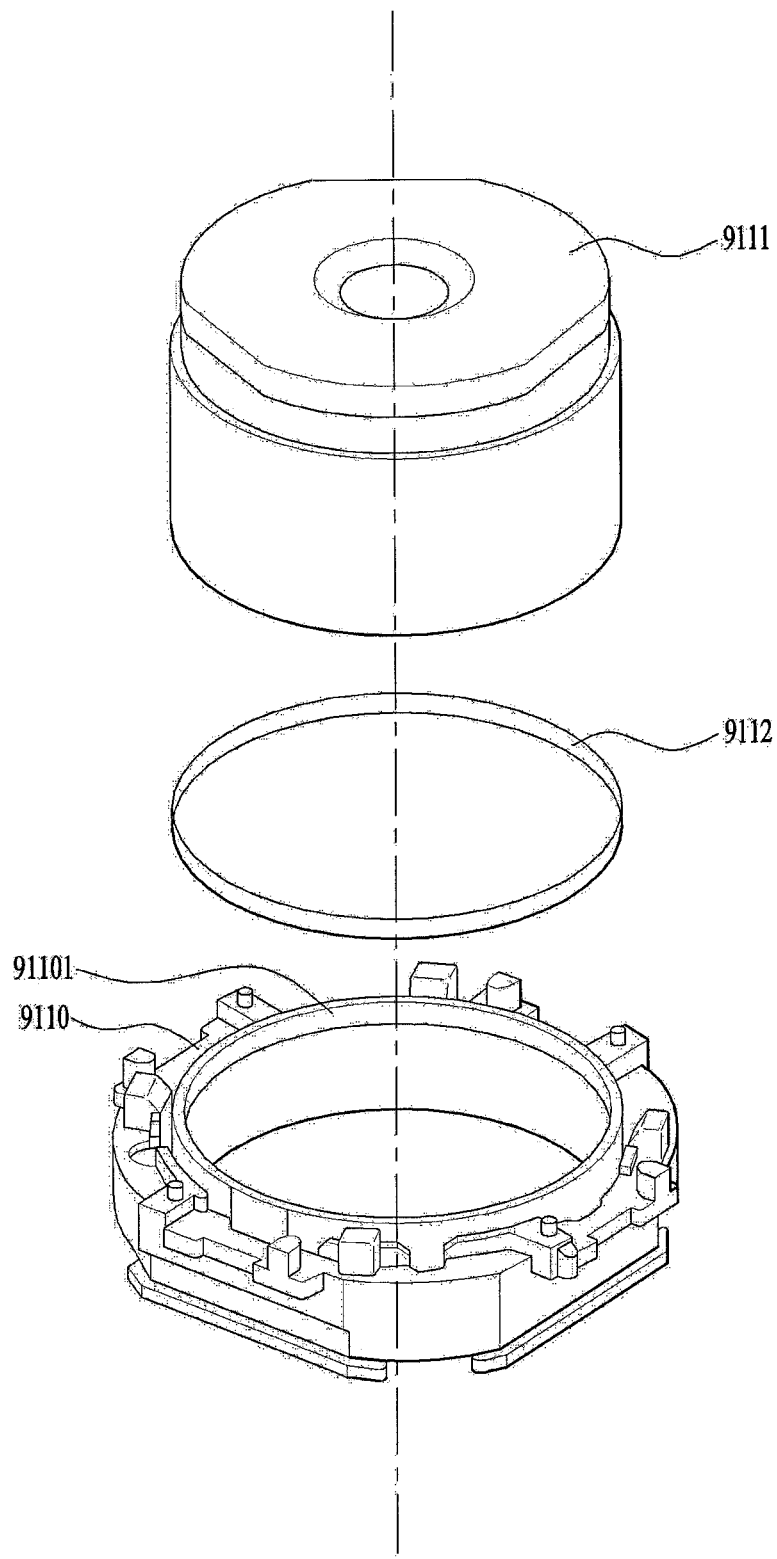
FIG. 7 illustrates an exploded perspective view of the lens barrel, the bobbin, and a fixing part of the lens driving device according to another embodiment.

FIG. 7 illustrates an exploded perspective view of the lens barrel, the bobbin, and the fixing part of the lens driving device according to another embodiment, and FIG. 8 illustrates the coupling relationship of the lens barrel and the bobbin in the lens driving device according to the embodiment.

Referring to FIGS. 7 and 8, the lens driving device of the embodiment may include the lens barrel 9111, which includes at least one lens, the bobbin 9110, which provides a space for accommodating the lens barrel 9111 and has a hollow shape, and the fixing part 9112 provided between the lens barrel 9111 and the bobbin 9110 in order to inhibit the lens barrel 9111 from being separated from the bobbin 9110 in the height direction or to inhibit the lens barrel 9111 from tilting by a predetermined angle within the bobbin 9110.

The fixing part 9112 may be ultraviolet (UV) curing epoxy that is cured via irradiation of ultraviolet light, or may be thermosetting epoxy that is cured by radiation of heat.

Unlike the lens driving device illustrated in FIG. 6, the bobbin 9110 may further include a bobbin rib 91101, which protrudes inwards by a predetermined height, and the fixing part 9112 may have one end provided so as to be in surface contact with the bobbin rib 91101 and the other end provided so as to be in surface contact with the lens barrel 9111.

When the bobbin rib 91101 protrudes by a predetermined height from the inner side surface of the bobbin 9110, the bobbin 9110 may apply compressive force to the fixing part 9112, which is provided so as to be in surface contact with the bobbin rib 91101. This may allow the lens barrel 9111 to be more effectively fixed within the bobbin 9110.

In addition, since the fixing part 9112 may be provided so as to be in surface contact with both the upper surface and the lower surface of the bobbin rib 91101, which is provided so as to protrude inwards, when shocks are applied to the lens driving device of the embodiment in a direction orthogonal to the upper surface or the lower surface of the lens barrel 9111 after the fixing part 9112 is cured, the coupling of the upper surface or the lower surface of the protruding bobbin rib 91101 and the fixing part 9112, which is provided so as to be in surface contact with the upper surface or the lower surface, may provide a more stabilized structure against external shocks.

The bobbin rib 91101 may have a strip shape and may be provided on the inner peripheral surface of the bobbin 9110 to have a hollow cross-sectional shape as illustrated. Alternatively, a plurality of bobbin ribs 91101 may be spaced apart from each other by a predetermined distance on the inner peripheral surface of the bobbin 9110.

Although the above-described embodiment illustrates that the bobbin rib 91101 is provided on the bobbin 9110 so as to protrude inwards and the outer side surface of the lens barrel 9111 is a flat surface, unlike this, a lens barrel rib may be provided on the outer side surface of the lens barrel 9111 so as to protrude outwards by a predetermined height and the inner side surface of the bobbin 9110 may be a flat surface.

In addition to the bobbin 9110, the lens barrel 9111 may include an additional structure that applies compressive force to the fixing part 9112. This will be described below with reference to FIGS. 9A-9C.

FIGS. 9A-9C illustrate various embodiments of region "A" illustrated in FIG. 8.

Referring to FIGS. 9A-9C, the lens barrel 9111 of the lens driving device of the embodiment may include the lens barrel rib 91111 (FIG. 9A), which protrudes by a predetermined height to the outside of the lens barrel 9111, and a lens barrel recess 91112 (FIG. 9B), which is formed to a predetermined depth in the lens barrel 9111.

When the lens barrel 9111 includes the lens barrel rib 91111 or the lens barrel recess 91112, it is possible to more effectively inhibit the lens barrel 9111 accommodated within the bobbin 9110 from undergoing predetermined displacement in a direction orthogonal to the upper surface or the lower surface of the lens barrel 9111.

In addition, the lens barrel rib 91111 or the lens barrel recess 91112 may have a rectangular cross-sectional shape as illustrated in the drawing, but is not limited thereto, and may be modified in various manners based on the needs of the user.

For example, as illustrated in FIG. 9C, the contact surface of a portion of the lens barrel 9111 that is in surface contact with the fixing part 9112 may have a sinusoidal shape.

That is, when the lens barrel 9111 does not have the lens barrel rib 91111 or the lens barrel recess 91112 described above, the contact surface of the lens barrel 9111 that is in contact with the fixing part 9112 may have a sinusoidal shape. When the lens barrel 9111 has the lens barrel rib 91111 or the lens barrel recess 91112, the contact surface of the lens barrel rib 91111 or the lens barrel recess 91112 that is in contact with the fixing part 9112 may have a sinusoidal shape.

This serves to increase the contact area with respect to the fixing part 9112, thereby allowing the lens barrel 9111 to be more effectively fixed to the bobbin 9110.

Figure 10:
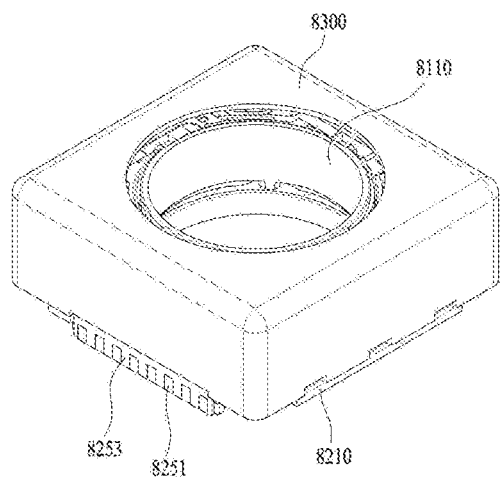
FIG. 10 is a perspective view schematically illustrating a lens driving device according to still another embodiment.
Figure 11:
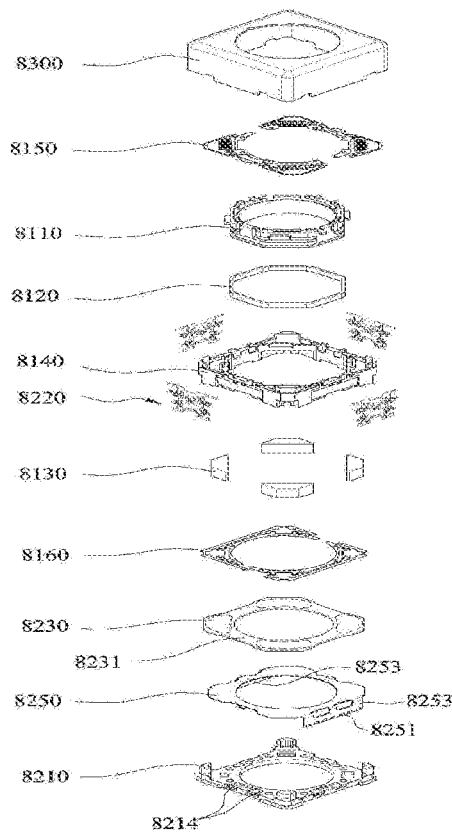
FIG. 11 is an exploded perspective view illustrating the lens driving device according to the embodiment.

FIG. 10 is a perspective view schematically illustrating a lens driving device according to still another embodiment, and FIG. 11 is an exploded perspective view illustrating the lens driving device according to the embodiment.

As illustrated in FIG. 11, the lens driving device according to the embodiment may include a movable unit. Here, the movable unit may perform a lens auto-focusing function and a hand-tremor compensation function. The movable unit may include a bobbin 8110, a first coil 8120, a first magnet 8130, a housing 8140, an upper elastic member 8150, and a lower elastic member 8160.

The bobbin 8110 is provided on the outer peripheral surface thereof with the first coil 8120, which is disposed inside the first magnet 8130. The bobbin may be provided in the inner space of the housing 8140 so as to be reciprocatingly movable in the first direction by electromagnetic interaction between the first magnet 8130 and the first coil 8120. The first coil 8120 may be provided on the outer peripheral surface of the bobbin 8110 so as to electromagnetically interact with the first magnet 8130.

In addition, the bobbin 8110 may be elastically supported by the upper and lower elastic members 8150 and 9160, and may move in the first direction to perform an auto-focusing function.

The bobbin 8110 may include a lens barrel 8400 (see FIG. 12) in which at least one lens is provided. The lens barrel 8400 may be coupled inside the bobbin 8110 in various manners.

For example, a female screw-thread may be formed in the inner peripheral surface of the bobbin 8110 and a male screw-thread may be formed in the outer peripheral surface of the lens barrel 8400 so as to correspond to the female screw-thread, so that the lens barrel 8400 may be coupled to the bobbin 8110 via screwing.

However, the disclosure is not limited thereto, and instead of forming the screw-thread in the inner peripheral surface of the bobbin 8110, the lens barrel 8400 may be directly fixed to the inner side of the bobbin 8110 by a method other than screwing. Alternatively, one or more lens sheets may be integrally formed with the bobbin 8110 without the lens barrel 8400.

The auto-focusing function is controlled based on the direction of current. The auto-focusing function may be realized via movement of the bobbin 8110 in the first direction. For example, when forward current is applied, the bobbin 8110 may move upward from the initial position thereof. When reverse current is applied, the bobbin 8110 may move downward from the initial position thereof.

Alternatively, the distance of movement in a given direction from the initial position may be increased or reduced by adjusting the amount of forward or reverse current.

The bobbin 8110 may be formed on the upper surface and the lower surface thereof with a plurality of upper support protrusions and lower support protrusions. Each of the upper support protrusions may have a cylindrical shape or a prismatic shape, and may be coupled and fixed to the upper elastic member 8150.

Each of the lower support protrusions may have a cylindrical shape or a prismatic shape, similar to the upper support protrusions, and may be coupled and fixed to the lower elastic member 8160.

Here, the upper elastic member 8150 may be formed with holes, which correspond to the upper support protrusions, and the lower elastic member 8160 may be formed with holes, which correspond to the lower support protrusions. The respective support protrusions and the respective holes may be fixedly coupled to each other by thermo-welding or using an adhesive member such as epoxy.

The housing 8140 may take the form of a hollow column to support the first magnet 8130, and may have a substantially square shape. The first magnet 8130 and a support member 8220 may be respectively coupled to and disposed on a side surface portion of the housing 8140.

In addition, as described above, the bobbin 8110 may be disposed within the housing 8140 so as to move in the first direction under the guidance of the elastic members 8150 and 8160. In the embodiment, the first magnet 8130 may be disposed on a corner portion of the housing 8140, and the support member 8220 may be disposed on the side surface of the housing.

The upper elastic member 8150 may be provided above the bobbin 8110, and the lower elastic member 8160 may be provided below the bobbin 8110. The upper elastic member 8150 and the lower elastic member 8160 may elastically support upward movement and/or downward movement of the bobbin 8110 in the first direction. The upper elastic member 8150 and the lower elastic member 8160 may be leaf springs.

The upper elastic member 8150, as illustrated in FIG. 11, may include two members separated from each other. Through the dually divided structure, the respective divided parts of the upper elastic member 8150 may receive current having different polarities, or different voltages. In an alternative embodiment, the lower elastic member 8160 may have a dually divided structure, and the upper elastic member 8150 may have an integrated structure.

Meanwhile, the upper elastic member 8150, the lower elastic member 8160, the bobbin 8110, and the housing 8140 may be assembled by, for example, thermo-welding and/or a bonding operation using an adhesive or the like. At this time, for example, they are fixed by thermo-welding, and thereafter, the fixing may be finished by bonding using an adhesive.

A base 8210 may be disposed below the bobbin 8110, and may have a substantially square shape. A printed circuit board 8250 may be disposed on the base, and the underside of the support member 8220 may be fixed to the base. In addition, the base 8210 may be formed in the upper surface thereof with a seating recess 8214 for the support member 8220, so that the support member 8220 may be inserted into the seating recess. An adhesive may be applied to the seating recess 8214 for the support member 8220 to immovably fix the support member 8220.

The base 8210 may be formed with a support groove in a portion thereof that faces the portion of the printed circuit board 8250, on which a terminal surface 8253 is formed, the support groove having a size that corresponds to that of the terminal surface. The support groove is concavely formed to a predetermined depth from the outer peripheral surface of the base 8210, thereby inhibiting the portion, on which the terminal surface 8253 is formed, from protruding outwards, or adjusting the extent to which the portion protrudes.

The support member 8220 may be disposed on the side surface of the housing 8140, and may be coupled at the upper side thereof to the housing 8140 and coupled at the lower side thereof to the base 8210. The support member may support the bobbin 8110 and the housing 8140 so as to be movable in the second direction and the third direction, which are orthogonal to the first direction, and may be electrically connected to the first coil 8120.

Since the support member 8220 according to the embodiment is disposed on each outer side surface of the square of the housing 8140, a total of four support members may be provided in a symmetrical arrangement. However, the disclosure is not limited thereto, and a total of eight support members including two provided for each straight surface may be provided.

In addition, the support member 8220 may be electrically connected to the upper elastic member 8150, or may be electrically connected to the straight surface of the upper elastic member 8150.

In addition, since the support member 8220 is formed separately from the upper elastic member 8150, the support member 8220 and the upper elastic member 8150 may be electrically connected to each other using a conductive adhesive, a solder, or the like. Thus, the upper elastic member 8150 may apply current to the first coil 8120 via the support member 8220, which is electrically connected thereto.

Meanwhile, FIG. 11 illustrates the support member 8220 having a plate shape by way of example, but the disclosure is not limited thereto. That is, the support member may have a wire shape.

A second coil 8230 may move the housing 8140 in the second direction and/or the third direction via electromagnetic interaction with the first magnet 8130, thereby being capable of performing hand-tremor compensation.

Here, the second and third directions may include not only the x-axis and y-axis directions but also the directions substantially close to the x-axis and y-axis directions. That is, the housing 8140 may move in directions parallel to the x-axis and the y-axis when viewed in terms of driving in the embodiment, but may move in directions slightly oblique to the x-axis and the y-axis when moving while being supported by the support member 8220.

In addition, it may be necessary to provide the first magnet 8130 at a position that corresponds to the second coil 8230.

The second coil 8230 may be disposed so as to oppose to the first magnet 8130 fixed to the housing 8140. In an embodiment, the second coil 8230 may be disposed outside the first magnet 8130. Alternatively, the second coil 8230 may be downwardly spaced apart from the first magnet 8130 by a constant distance.

According to the embodiment, a total of four second coils 8230 may be provided respectively on four corner portions of a circuit member 8231, without being limited thereto. Only two second coils may be provided respectively in the second direction and in the third direction, or more than four second coils may be provided.

In the embodiment, the circuit member 8231 may be formed with a circuit pattern that takes the form of the second coil 8230, and a separate second coil may be additionally disposed above the circuit member 8231, without being limited thereto. Instead of forming the circuit pattern that takes the form of the second coil 8230, only the second coil 8230 may be separately disposed on the circuit member 8231 above the circuit member 8231.

Alternatively, the second coil 8230 may be configured by winding a wire in a doughnut shape, or may be formed to have an FP coil shape, so as to be electrically connected to the printed circuit board 8250.

The second coil 8230 may be disposed above the base 8210 and below the housing 8140. Here, the circuit member 8231 including the second coil 8230 may be provided on the upper surface of the printed circuit board 8250, which is disposed above the base 8210.

However, the disclosure is not limited thereto, and the second coil 8230 may be disposed in close contact with the base 8210, may be spaced apart from the base by a predetermined distance, or may be formed on a separate board so that the board may be stacked on and connected to the printed circuit board 8250.

The printed circuit board 8250 may be coupled to the upper surface of the base 8210, and as illustrated in FIG. 11, may be formed with a hole or a slot at a position that corresponds to the seating recess 8214 in the support member 8220 so as to expose the seating groove.

The printed circuit board 8250 may be formed with the terminal surface 8253, which is formed by bending, so that a terminal 8251 is provided on the terminal surface. The embodiment illustrates the printed circuit board 8250 formed with two bent terminal surfaces 8253. A plurality of terminals 8251 may be disposed on each terminal surface 8253 and may supply current to the first coil 8120 and the second coil upon receiving an external voltage.

The number of terminals formed on the terminal surface 8253 may be increased or reduced based on the constituent elements that need to be controlled. In addition, the printed circuit board 8250 may include one terminal surface 8253, or three or more terminal surfaces.

The cover member 8300 may have a substantially box shape, may accommodate, for example, the movable unit described above, the second coil 8230, and a portion of the printed circuit board 8250 therein, and may be coupled to the base 8210.

The cover member 8300 may protect, for example, the movable unit, the second coil 8230, and the printed circuit board 8250, which are accommodated therein, and more particularly, may limit outward leakage of an electromagnetic field, which is created by the first magnet 8130, the first coil 8120, the second coil 8230, and the like therein, thereby enabling the electromagnetic field to be focused.

Figure 12:
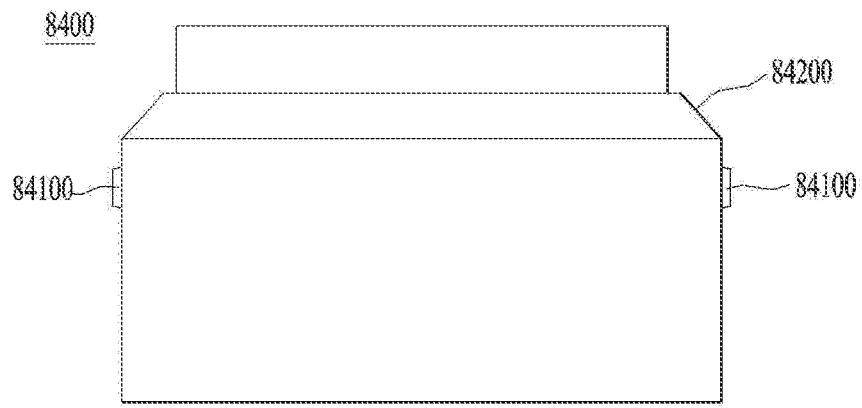
FIG. 12 is a view illustrating a lens barrel according to an embodiment.

FIG. 12 is a view illustrating the lens barrel 8400 according to an embodiment. One lens sheet may be coupled to the lens barrel 8400, or two or more lenses may constitute an optical system.

The lens barrel 8400 may include a coupling protrusion 84100 and a slope 84200. At least one coupling protrusion 84100 may be formed on the outer peripheral surface of the lens barrel 8400, and may be inserted into a coupling recess 81100 formed in the bobbin 8110, which will be described below.

In order to increase the coupling force of the bobbin 8110 and the lens barrel 8400, a plurality of coupling protrusions 84100 may be provided. For example, as illustrated in FIG. 12, a pair of coupling protrusions may be formed on the outer peripheral surface of the lens barrel 8400 at positions symmetrical to each other about the center of the lens barrel 8400.

The coupling protrusion 84100 is coupled to the coupling recess 81100 to couple the bobbin 8110 and the lens barrel 8400 to each other, thereby increasing the coupling force of the bobbin 8110 and the lens barrel 8400. As such, the coupling protrusion serves to inhibit the lens barrel 8400 from being separated from the bobbin 8110 even when external shocks are applied to the lens driving device.

Therefore, more than three coupling protrusions 84100 may be provided on the outer peripheral surface of the lens barrel 8400 in order to further increase the coupling force of the bobbin 8110 and the lens barrel 8400.

In addition, there is a need to inhibit external shocks from being concentrated on a specific portion of the bobbin 8110 or the lens barrel 8400. To this end, the coupling protrusions 84100 may need to be spaced apart from each other by a constant distance in the circumferential direction on the outer peripheral surface of the lens barrel 8400.

Since the coupling protrusions 84100 are symmetrically or radially disposed about the center of the lens barrel 8400 in the case in which the coupling protrusions 84100 are disposed to have the structure described above, when external shocks are applied, it is possible to inhibit external shocks from being concentrated on a specific portion of the lens barrel 8400 or the coupling protrusions 84100.

Meanwhile, in the case in which the plurality of coupling protrusions 84100 are provided on the outer peripheral surface of the lens barrel 8400, the number of coupling recesses 81100, which will be described below, may be the same as the number of coupling protrusions 84100, and may be disposed at positions that correspond to the coupling protrusions 84100.

The slope 84200, as illustrated in FIG. 12, may be formed on the outer peripheral surface of the lens barrel 8400 above the coupling protrusions 84100 when viewing the drawing. The slope 84200 may be formed at a position that faces a stepped portion 81200, which will be described below, in the first direction.

When the slope 84200 and the stepped portion 81200 are disposed at positions that face each other and are adhered to each other using an adhesive g, the bobbin 8110 and the lens barrel 8400 may be coupled to each other using the adhesive g. The structure in which the slope 84200 and the stepped portion 81200 are coupled to each other using the adhesive g will be described below in detail. Meanwhile, the adhesive g may be, for example, epoxy or a thermosetting material.

Figure 13:
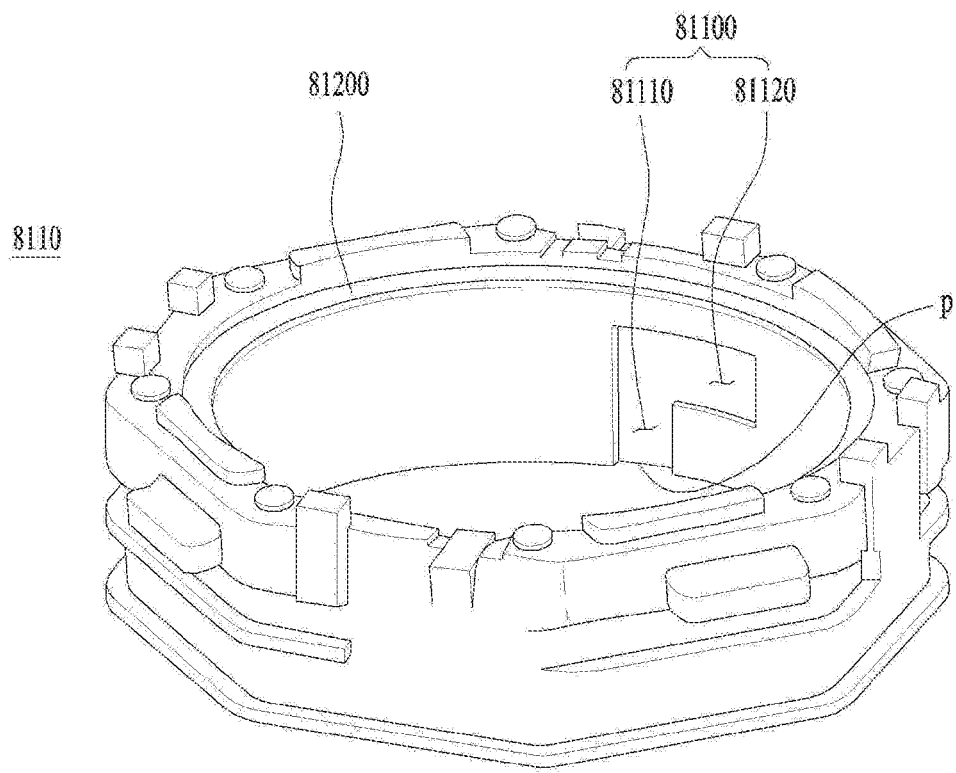
FIG. 13 is a perspective view illustrating a bobbin according to an embodiment.

FIG. 13 is a perspective view illustrating the bobbin 8110 according to an embodiment. As illustrated in FIG. 13, the bobbin 8110 of the embodiment may include the coupling recess 81100 and the stepped portion 81200. The coupling recess 81100 may be formed in the inner peripheral surface of the bobbin 8110, and may be provided in the same number as that of the coupling protrusions 84100. The coupling recess is a portion into which the coupling protrusion 84100 is inserted.

As described above, when the coupling protrusion 84100 is inserted into the coupling recess 81100 so that the bobbin 8110 and the lens barrel 8400 are coupled to each other, this may increase the coupling force between the bobbin 8110 and the lens barrel 8400.

The coupling recess 81100 may be provided in a number and position that correspond to the number and position of the coupling protrusion 84100. Thus, in the case in which the plurality of coupling protrusions 84100 are provided and the coupling protrusions 84100 are symmetrically or radially disposed about the lens barrel 8400, a plurality of coupling recesses 81100 may be symmetrically or radially formed in the inner peripheral surface of the bobbin 8110 about the center of the bobbin 8110.

As illustrated in FIG. 13, the coupling recess 81100 may include a first recess 81110 and a second recess 81120. The first recess 81110 may be formed in the first direction in the inner peripheral surface of the bobbin 8110. The second recess 81120 may be connected to the first recess 81110, and may be formed in the circumferential direction in the inner peripheral surface of the bobbin 8110.

The first recess 81110 is a portion in which the coupling protrusion 84100 is inserted into the coupling recess 81100. Thus, the first recess 81110 may be formed in the lower surface thereof with an opening p so that the coupling protrusion 84100 is inserted into the opening, when viewing the drawing.

The second recess 81120 is a portion in which the coupling protrusion 84100 inserted through the first recess 81110 is seated in the coupling recess 81100. That is, the coupling protrusion 84100 may be inserted into the first recess 81110, and thereafter may be rotated via rotation of the bobbin 8110 so as to be seated in the second recess 81120. The method of coupling the coupling protrusion 84100 into the coupling recess 81100 will be described below in detail with reference to the drawings.

Meanwhile, the coupling recess 81100 may be formed by removing a portion of the inner peripheral surface of the bobbin 8110, or by injection molding. The portion of the bobbin 8110 in which the coupling recess 81100 is formed may be reduced in thickness. Due to this, since the strength of the entire bobbin 8110 may be reduced, in order to inhibit this, the coupling recess 81100 may be appropriately formed in a specific portion of the bobbin 8110 having a larger thickness.

In addition, in order to inhibit deterioration in the strength of the bobbin 8110 due to the formation of the coupling recess 81100, the bobbin 8110 may be increased in thickness in the portion thereof in which the coupling recess 81100 is formed. That is, the shape of the portion of the bobbin 8110 may be changed so that the portion in which the coupling recess 81100 is formed is thicker than the remainder thereof.

The stepped portion 81200, as illustrated in FIG. 13, may be disposed above the coupling recess 81100, when viewing the drawing. That is, the coupling recess 81100 may be disposed below the stepped portion 81200, and the first recess 81110 may have the opening g formed in the lower surface of the bobbin 8110.

The stepped portion 81200 takes the form of a ring that protrudes in the circumferential direction from the inner peripheral surface of the bobbin 8110, and a portion of the adhesive g that couples the lens barrel 8400 and the bobbin 8110 to each other may be adhered to a part of the stepped portion.

The stepped portion 81200 may serve as follows, for example. First, the stepped portion 81200 may increase the area of an adhered portion of the adhesive g to increase the coupling force of the bobbin 8110 and the lens barrel 8400.

In addition, since it is possible to increase the area of an adhered portion of the adhesive g, the adhesive g may maintain sufficient adhesive force for the bobbin 8110. Thus, even when external shocks are continuously applied to the lens driving device, the adhesive g may not be easily detached from the bobbin 8110.

In addition, as described above, since the stepped portion 81200 is disposed so as to face the slope 84200 in the first direction, the size of a gap between the stepped portion 81200 and the slope 84200 may be remarkably reduced. Therefore, it is possible to inhibit or remarkably reduce damage to respective constituent elements including the image sensor (not illustrated), which occurs when the adhesive g that is not yet cured is introduced into the underside of the lens driving device through the gap.

In addition, the stepped portion 81200 may serve as a stopper of the lens barrel 8400. That is, when the adhesive g, which couples the lens barrel 8400 and the bobbin 8110 to each other, is detached due to external shocks continuously applied to the lens driving device, the stepped portion may inhibit the lens barrel 8400 from being excessively separated from the bobbin 8110.

That is, the stepped portion 81200 is disposed so as to face the slope 84200 in the first direction, and a first distance d1, which is measured as a first direction distance between the stepped portion 81200 and the slope 84200, is very small.

Thus, through the structure described above, even if the adhesive g is detached, the stepped portion 81200 may inhibit the lens barrel 8400 from being excessively separated upward in the first direction from the bobbin 8110. The role of the stepped portion 81200 as the stopper will be concretely described below with reference to the drawings.

Figure 14:
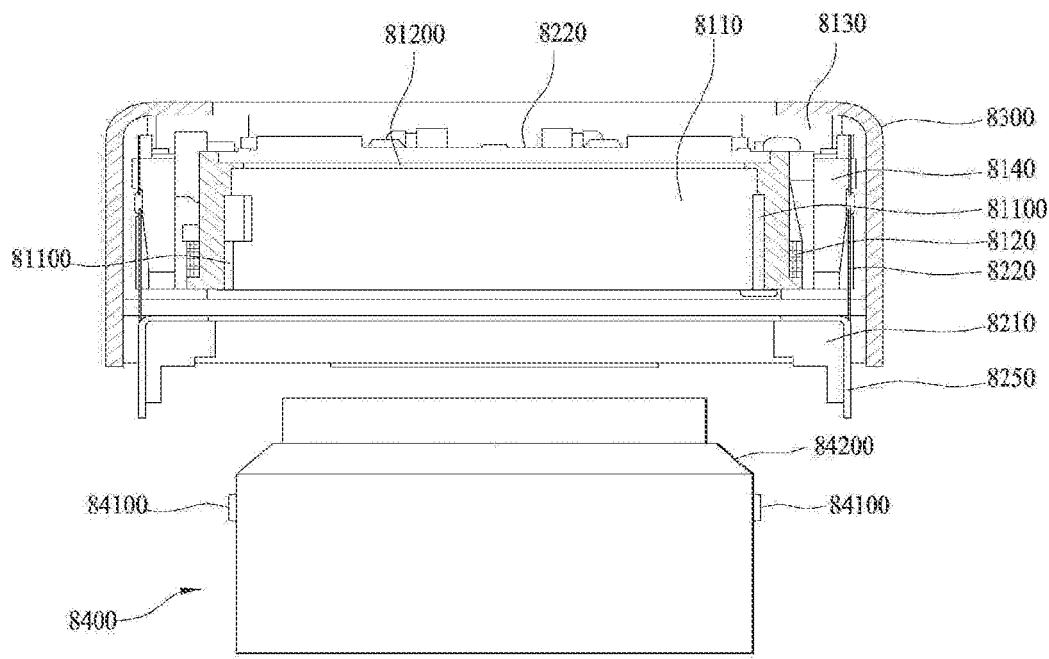
FIGS. 14 and 15 are views for explaining a method of coupling the lens barrel to the bobbin.
Figure 15:
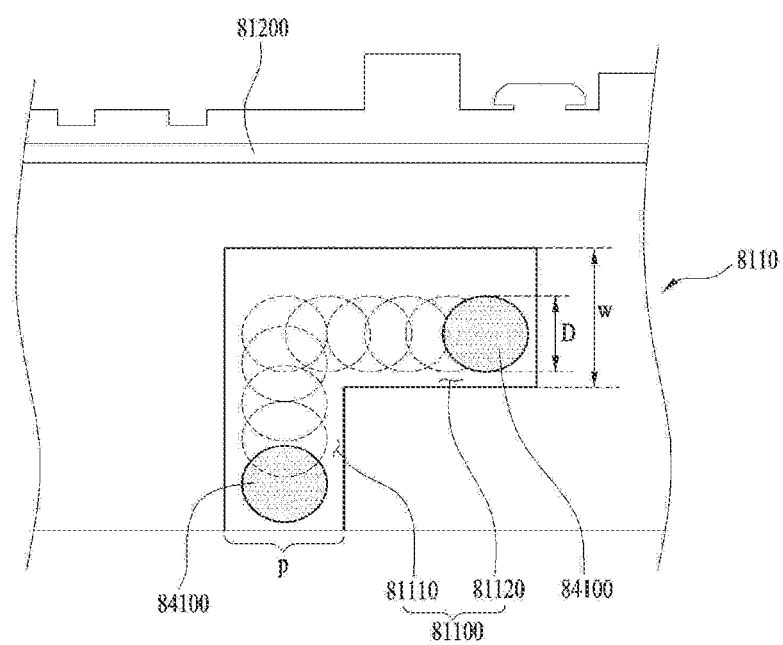

FIGS. 14 and 15 are views for explaining a method of coupling the lens barrel 8400 to the bobbin 8100. Here, FIG. 15 illustrates the coupling recess 81100 according to an embodiment.

The lens barrel 8400 may be coupled to the bobbin 8110 by the following method. First, the lens barrel 8400 is inserted in the first direction from the lower side of the bobbin 8110. At this time, the positions of the coupling protrusion 84100 and the first recess 81110 are aligned with each other so as to enable the coupling protrusion 84100 to be inserted into the first recess 81110.

Subsequently, the coupling protrusion 84100 is inserted into the first recess 81110 of the coupling recess 81100 through the opening g in the first recess 81110. The lens barrel 8400 is continuously pushed upward in the first direction until the coupling protrusion 84100 reaches the second recess 81120.

Subsequently, once the coupling protrusion 84100 has reached the position of the second recess 81120, the lens barrel 8400 is rotated in a given direction relative to the bobbin 8110 about the first direction so as to be farther away from the connection region of the first recess 81110 and the second recess 81120.

At this time, after being inserted into the first recess 81110 in the first direction, the coupling protrusion 84100 may be rotated about the first direction and inserted into the second recess 81120 so as to be seated in the second recess 81120.

Meanwhile, in order to enable the coupling protrusion 84100 to be smoothly coupled into the coupling protrusion 84100, the width of the first recess 81110 and the width w of the second recess 81120 may be larger than the diameter D of the coupling protrusion 84100.

As the coupling protrusion 84100 is seated in the second recess 81120 of the coupling recess 81100 through the above-described process, the lens barrel 8400 may be coupled to the bobbin 8110.

With the structure described above, in the embodiment, by coupling the bobbin 8110 and the lens barrel 8400 to each other using the coupling protrusion 84100 and the coupling recess 81100, the bobbin 8110 and the lens barrel 8400 may remain in the coupled state even when the adhesive g, which couples the bobbin 8110 and the lens barrel 8400 to each other, is detached due to external shocks.

At this time, the coupled lens barrel 8400 may move slightly in the first direction relative to the bobbin 8110. Therefore, by again coupling the bobbin 8110 and the lens barrel 8400 to each other using the adhesive g, it is possible to inhibit the lens barrel 8400 from moving in the first direction relative to the bobbin 8100. Hereinafter, the coupling structure of the bobbin 8110 and the lens barrel 8400 using the adhesive g will be described.

Figure 16:
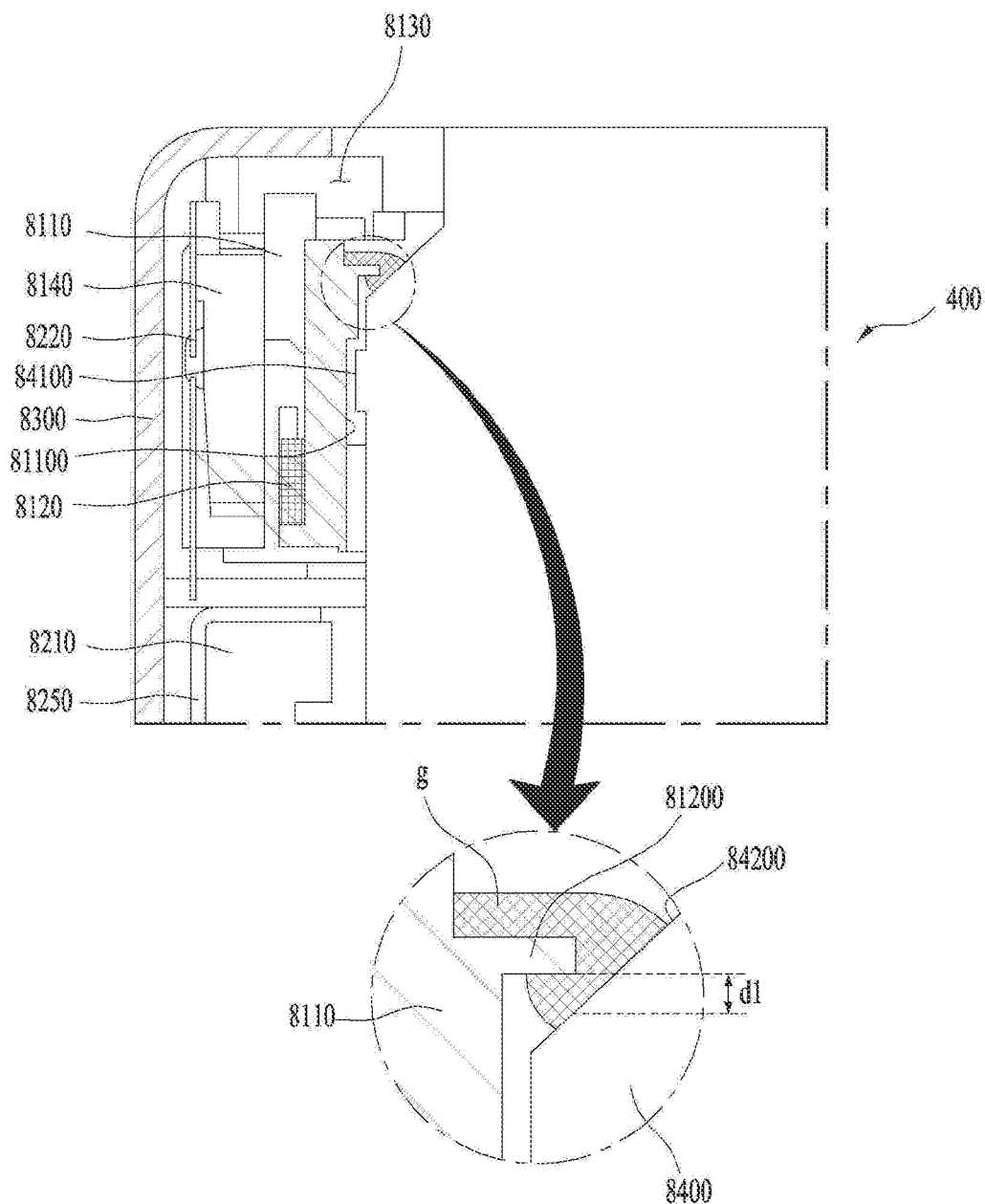
FIG. 16 is a cross-sectional view illustrating the state in which the bobbin and the lens barrel are coupled to each other.

FIG. 16 is a cross-sectional view illustrating the state in which the bobbin 8110 and the lens barrel 8400 are coupled to each other. As illustrated in FIG. 16, the stepped portion 81200 may be disposed at a position at which it faces the slope 84200, which is formed on the outer peripheral surface of the lens barrel 8400, in the first direction.

In the structure described above, the adhesive g may be applied to both the stepped portion 81200 and the slope 84200 so as to allow the upper surface and the side surface of the stepped portion 81200 to be coupled to the slope 84200. Since the applied adhesive g is movable before being cured, a part of the adhesive g may be introduced into the lower portion of the stepped portion 81200 through the gap between the stepped portion 81200 and the slope 84200.

A part of the adhesive g, which has been introduced into the lower portion of the stepped portion 81200 through the gap, is cured, thus serving to increase the adhesive area between the bobbin 8110 and the lens barrel 8400. In addition, since the gap is formed to have a very small size due to the presence of the stepped portion 81200, it is possible to inhibit excessive adhesive g from being introduced into the lens driving device through the gap.

With the structure described above, in the embodiment, the adhesive g may increase the coupling area between the bobbin 8110 and the lens barrel 8400, and consequently, may increase the coupling force of the bobbin 8110 and the lens barrel 8400.

In addition, since the gap is formed in a portion, on which the adhesive g is applied, to have a very small size due to the stepped portion 81200, it is possible to remarkably reduce the amount of the adhesive g that moves into the lens driving device through the gap, and thus, to inhibit damage to the image sensor and other elements by the adhesive g introduced into the lens driving device through the gap.

Hereinafter, the role of the stepped portion 81200 as a stopper for the lens barrel 8400 will be described with reference to FIGS. 15 and 16. As illustrated in FIG. 16, the first distance d1 may be measured as the first direction distance between the stepped portion 81200 and the slope 84200.

Meanwhile, referring to FIG. 15, a second distance d2 may be calculated using the following Equation.

$$d2 = w - D \qquad \text{Equation 1}$$

That is, the second distance d2 may be taken as the difference between the width w of the second recess 81120 and the diameter D of the coupling protrusion 84100.

In the embodiment, the first distance d1 may be smaller than the second distance d2. With this structure, when the adhesive g is detached due to external shocks, the stepped portion 81200 may effectively serve as a stopper for the lens barrel 8400.

That is, when the cured adhesive g is detached rather than being adhered to the bobbin 8110 and the lens barrel 8400 due to external shocks applied to the lens driving device, the lens barrel 8400 may move in the first direction relative to the bobbin 8110, and the maximum movable width may correspond to the second distance d2.

The width w of the second recess 81120 may be somewhat large in order to allow the coupling protrusion 84100 to be smoothly coupled into the coupling recess 81100. When the width w of the second recess 81120 is larger than the diameter D of the coupling protrusion 84100, the second distance d2 may correspondingly increase.

In the case in which the second distance d2 is excessively large, the lens barrel 8400 may excessively move in the first direction relative to the bobbin 8110 when the adhesive g is detached. When the lens barrel 8400 excessively moves in the first direction, for example, the auto-focusing function of the lens driving device may not be efficiently exerted.

Accordingly, due to erroneous operation of the auto-focusing function, the quality of an image captured by a camera module including the lens driving device may be remarkably deteriorated. Therefore, when the adhesive g is detached, it is necessary to inhibit the lens barrel 8400 from excessively moving in the first direction.

In the embodiment, since the first distance d1 is smaller than the second distance d2, the distance by which the lens barrel 8400 may move upwards in the first direction may be smaller than the second distance d2. This is because the stepped portion 81200 limits the distance by which the lens barrel 8400 moves upwards in the first direction.

In the embodiment, since the first distance d1 is smaller than the second distance d2 to inhibit the lens barrel 8400 from excessively moving in the first direction, it is possible to inhibit or remarkably reduce deterioration in the quality of a captured image due to arbitrary uncontrolled movement of the lens barrel 8400.

Meanwhile, a separate stopper may be provided on the bobbin 8110 or the lens barrel 8400 in order to limit the distance by which the lens barrel 8400 moves downward in the first direction.

Figure 17:
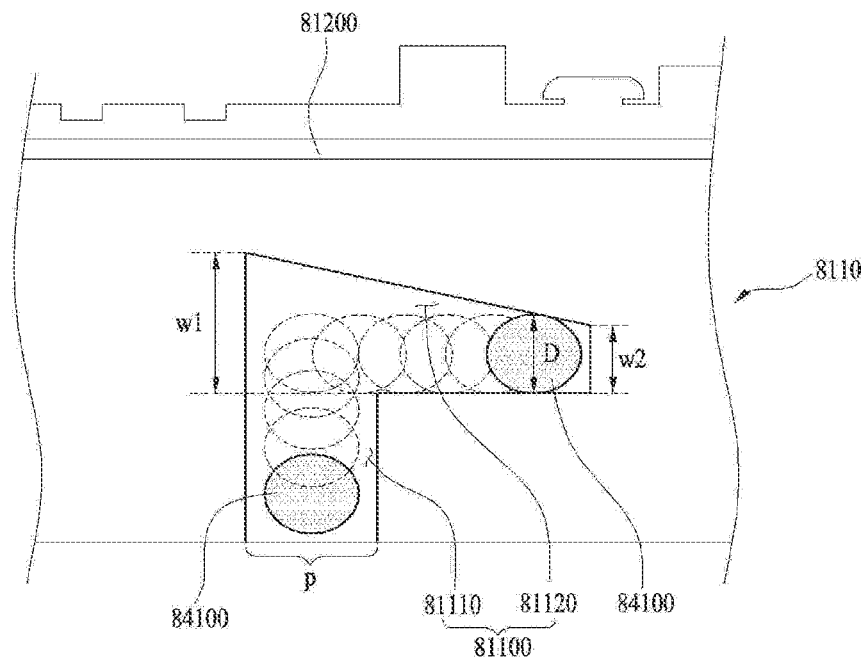
FIG. 17 is a view illustrating a coupling recess according to another embodiment.

FIG. 17 is a view illustrating the coupling recess 81100 according to another embodiment. As illustrated in FIG. 17, in the coupling recess 81100 of the embodiment, a portion of the second recess 81120 that is connected to the first recess 81110 has a first width w1 larger than a second width w2 of an end of the first recess 81110, which is spaced apart from the connection portion. In addition, the second width w2 may be equal to or less than the diameter D of the coupling protrusion 84100.

With the structure described above, when the coupling protrusion 84100 has been completely seated in the coupling recess 81100, the coupling protrusion may be tightly coupled into the second recess 81120. In this structure, even when the adhesive g is detached due to repeatedly applied external shocks, the coupling protrusion may remain tightly coupled into the second recess 81120.

Thus, even when the adhesive g is detached, it is possible to inhibit or remarkably reduce deterioration in the quality of an image due to arbitrary uncontrolled movement of the lens barrel 8400 in the first direction relative to the bobbin 8110.

Figure 18:
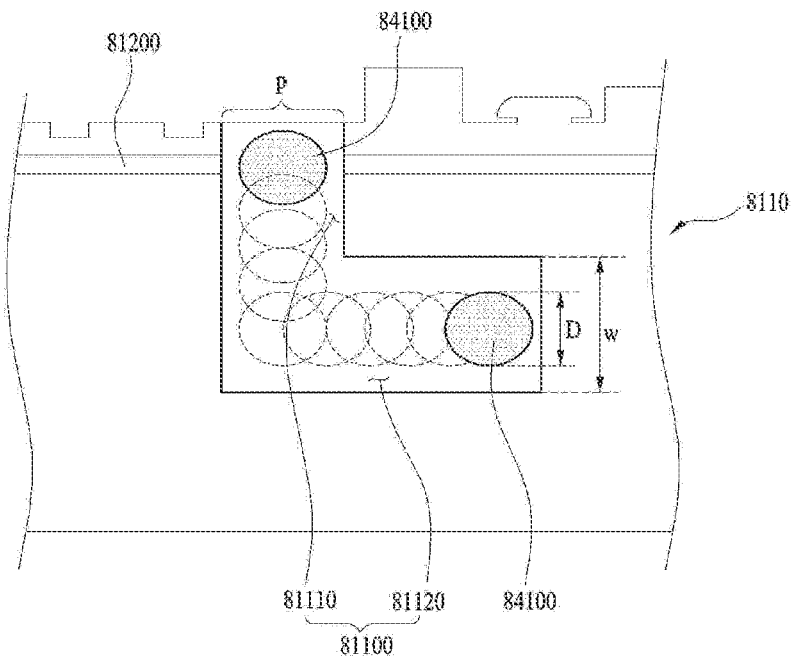
FIG. 18 is a view illustrating a coupling recess according to still another embodiment.

FIG. 18 is a view illustrating the coupling recess 81100 according to still another embodiment. In the embodiment, the first recess 81110 of the coupling recess 81100 may have an opening p, which is formed in the upper surface of the bobbin 8110. In this structure, when the lens barrel 8400 is coupled to the bobbin 8110, the lens barrel 8400 may be inserted in the first direction from the upper side of the bobbin 8110.

In addition, in the embodiment of FIG. 18, as illustrated in FIG. 18, the stepped portion 81200 may be formed in a portion, excluding the portion in which the first recess 81110 is formed, at a position similar to that of the stepped portion 81200 illustrated in FIG. 17. Alternatively, the stepped portion 81200 illustrated in FIG. 17 may not be formed.

In the embodiment of FIG. 18, when the stepped portion 81200 is not formed, the adhesive g may be applied to the inner peripheral surface of the bobbin 8110 at an appropriate position above the second recess 81120 to adhere the bobbin 8110 and the lens barrel 8400 to each other.

In addition, in the embodiment of FIG. 18, when the stepped portion 81200 is formed, the adhesive g may be applied to the upper surface of the stepped portion 81200 to adhere the bobbin 8110 and the lens barrel 8400 to each other.

In the embodiment of FIG. 18, regardless of whether or not the stepped portion 81200 is formed, in order to minimize the introduction of the adhesive g into the lens driving device, the adhesive g may be adhered to the slope 84200 of the lens barrel 8400.

Figure 19:
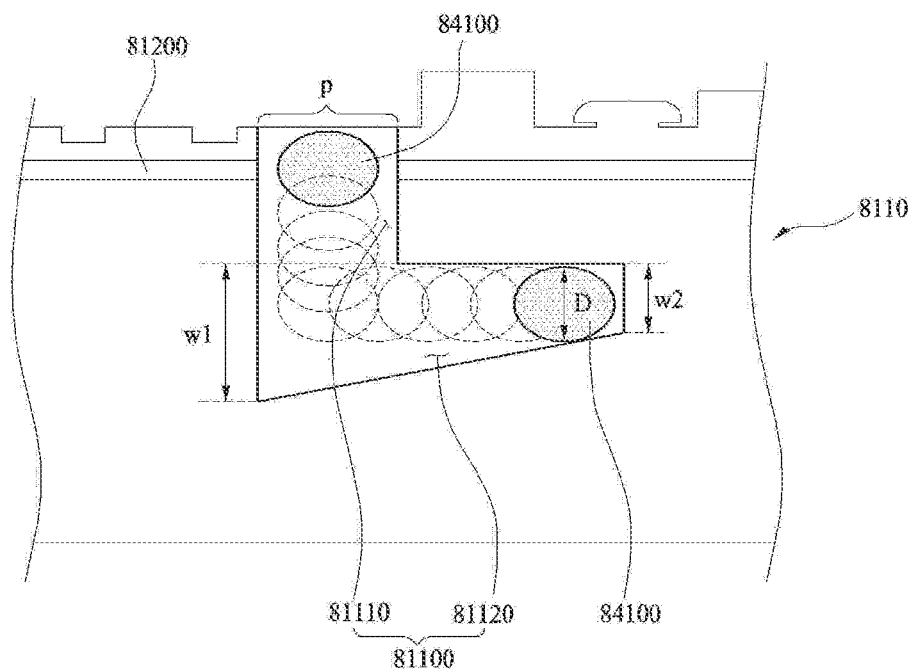
FIG. 19 is a view illustrating a coupling recess according to yet another embodiment.

FIG. 19 is a view illustrating the coupling recess 81100 according to yet another embodiment. As illustrated in FIG. 19, the first recess 81110 of the coupling recess 81100 may have the opening p formed in the upper surface of the bobbin 8110.

In addition, a portion of the second recess 81120 that is connected to the first recess 81110 may have a first width w1 larger than a second width w2 of an end of the first recess 81110 that is spaced apart from the connection portion. In addition, the second width w2 may be equal to or less than the diameter D of the coupling protrusion 84100.

With the structure described above, when the coupling protrusion 84100 has been completely seated in the coupling recess 81100, the coupling protrusion may be tightly coupled into the second recess 81120.

In addition, as described above, in this structure, even when the adhesive g is detached due to repeatedly applied external shocks, the coupling protrusion may remain tightly coupled into the second recess 81120.

Thus, even when the adhesive g is detached, it is possible to inhibit or remarkably reduce deterioration in the quality of an image due to arbitrary uncontrolled movement of the lens barrel 8400 in the first direction relative to the bobbin 8110.

Meanwhile, the lens driving device according to the above-described embodiment may be used in various fields, for example, a camera module. For example, the camera module may be applied to a mobile device such as a cellular phone.

The camera module according to the embodiment may include the lens barrel 8400 coupled to the bobbin 8110 and an image sensor (not illustrated). Here, the lens barrel 8400 may include at least one lens sheet, which transmits an image to the image sensor.

In addition, the camera module may further include an infrared cutoff filter (not illustrated). The infrared cutoff filter serves to inhibit light within an infrared range from being incident on the image sensor.

In this case, the infrared cutoff filter may be provided on the base 8210 illustrated in FIG. 11 at a position that corresponds to the image sensor, and may be coupled to a holder member (not illustrated). In addition, the holder member may support the underside of the base 8210.

The base 8210 may be provided with a terminal member for electrical conduction with the printed circuit board 8250, and may also be integrally formed with a terminal using a surface electrode or the like.

Meanwhile, the base 8210 may function as a sensor holder to protect the image sensor. In this case, the base 8210 may be formed with a protrusion that protrudes downward along the side surface. However, this may not be necessary, and although not illustrated, a separate sensor holder may be disposed below the base 8210 to perform the role of the protrusion.

Figure 20:
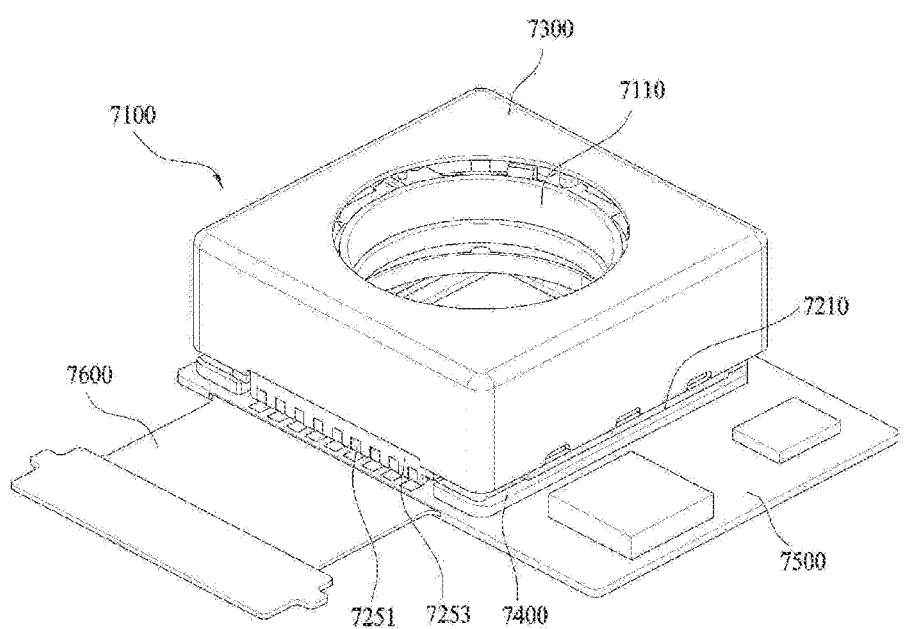
FIG. 20 is a perspective view illustrating a camera module according to another embodiment.

FIG. 20 is a perspective view illustrating a camera module according to another embodiment. FIG. 21 is an exploded perspective view illustrating a lens driving device 7100 according to still another embodiment.

As illustrated in FIG. 20, the camera module according to the embodiment may include the lens driving device 7100, a filter holder 7400, and a sensor holder 7500.

The lens driving device 7100 may include a base 7210, which is disposed in the lower portion thereof and is adhered to the filter holder 7400. The lens driving device 7100, as described above, may perform a hand-tremor compensation operation and/or an auto-focusing operation by moving an optical module constituted by a plurality of lenses. The concrete structure of the lens driving device 7100 will be described below with reference to FIG. 21.

The filter holder 7400 may be adhered to the base 7210, and a filter 7410 may be mounted on the filter holder. The sensor holder 7500 may be disposed below the filter holder 7400, and may be configured as a circuit board on which an image sensor 7510 is mounted.

In addition to the image sensor 7510, the sensor holder 7500 may include various drivers for driving the lens driving device 7100 and circuits for receiving current or receiving or transmitting electrical signals from or to external devices.

Thus, the sensor holder 7500 may be a circuit board. In addition, a connection board 7600 may be coupled to the sensor holder 7500 for electrical connection between the sensor holder 7500 and an external device such as, for example, a power supply, a display device, or a storage device.

The filter holder 7400 and the sensor holder 7500 will be described below in detail with reference to FIG. 22 and the following drawings.

As illustrated in FIG. 21, the lens driving device 7100 according to the embodiment may include a movable unit and a fixing part. Here, the movable unit may perform an auto-focusing function. The movable unit may include a bobbin 7110 and a first coil 7120, and the fixing part may include a first magnet 7130, a housing 7140, an upper elastic member 7150, and a lower elastic member 7160.

The bobbin 7110 may be provided inside the housing 7140 so as to move in the first direction, may include the first coil 7120 provided on the outer peripheral surface thereof so as to be disposed inside the first magnet 7130, and may be provided in the inner space of the housing 7140 so as to be reciprocatingly movable in the first direction by electromagnetic interaction between the first magnet 7130 and the first coil 7120. The first coil 7120 may be provided on the outer peripheral surface of the bobbin 7110 so as to electromagnetically interact with the first magnet 7130.

In addition, the bobbin 7110 may be elastically supported by the upper and lower elastic members 7150 and 7160, and may perform an auto-focusing function by moving in the first direction.

The bobbin 7110 may include a lens barrel (not illustrated) in which at least one lens is provided. The lens barrel may be coupled inside the bobbin 7110 in various manners.

For example, the lens barrel may be coupled to the bobbin 7110 using an adhesive. In addition, the lens barrel may be coupled to the bobbin 7110 by screwing. Alternatively, one or more lens sheets may be integrally formed with the bobbin 7110 without the lens barrel.

One lens sheet may be coupled to the lens barrel, or two or more lenses may constitute an optical system.

The auto-focusing function is controlled based on the direction of current. The auto-focusing function may be realized via movement of the bobbin 7110 in the first direction. For example, when forward current is applied, the bobbin 7110 may move upward from the initial position thereof. When reverse current is applied, the bobbin 7110 may move downward from the initial position thereof. Alternatively, the distance of movement in a given direction from the initial position may be increased or reduced by adjusting the amount of forward or reverse current.

The bobbin 7110 may be formed on the upper surface and the lower surface thereof with a plurality of upper support protrusions and lower support protrusions. Each of the upper support protrusions may have a cylindrical shape or a prismatic shape, and may be coupled and fixed to the upper elastic member 7150. Each of the lower support protrusions may have a cylindrical shape or a prismatic shape in the same manner as the upper support protrusions, and may be coupled and fixed to the lower elastic member 7160.

Here, the upper elastic member 7150 may be formed with holes, which correspond to the upper support protrusions, and the lower elastic member 7160 may be formed with holes, which correspond to the lower support protrusions. The respective support protrusions and the respective holes may be fixedly coupled to each other by thermo-welding or using an adhesive member such as epoxy.

The housing 7140 may take the form of a hollow column to support the first magnet 7130, and may have a substantially square shape. The first magnet 7130 may be coupled to and disposed on a side surface portion of the housing 7140. In addition, as described above, the bobbin 7110 may be disposed to move in the first direction under the guidance of the elastic members 7150 and 7160 within the housing 7140.

The upper elastic member 7150 may be provided above the bobbin 7110, and the lower elastic member 7160 may be provided below the bobbin 7110. The upper elastic member 7150 and the lower elastic member 7160 may be coupled to the housing 7140 and the bobbin 7110. The upper elastic member 7150 and the lower elastic member 7160 may elastically support upward movement and/or downward movement of the bobbin 7110 in the first direction. The upper elastic member 7150 and the lower elastic member 7160 may be leaf springs.

The upper elastic member 7150, as illustrated in FIG. 21, may include a plurality of members separated from each other. Through the multiply divided structure, the respective divided parts of the upper elastic member 7150 may receive current having different polarities, or different voltages. In addition, the lower elastic member 7160 may have a multiply divided structure, and may be electrically connected to the upper elastic member 7150.

Meanwhile, the upper elastic member 7150, the lower elastic member 7160, the bobbin 7110, and the housing 7140 may be assembled by, for example, thermo-welding and/or a bonding operation using an adhesive or the like.

The base 7210 may be disposed below the bobbin 7110, and may have a substantially square shape. A printed circuit board 7250 may be disposed or seated on the base.

The base 7210 may be formed with a support groove in a portion thereof that faces the portion of the printed circuit board 7250, on which a terminal surface 7253 is formed, the support groove having a size that corresponds to that of the terminal surface. The support groove may be concavely formed to a predetermined depth from the outer peripheral surface of the base 7210, thereby inhibiting the portion, on which the terminal surface 7253 is formed, from protruding outwards, or adjusting the extent to which the portion protrudes.

A support member 7220 may be disposed on the side surface of the housing 7140 so as to be spaced apart from the housing 7140, and may be coupled at the upper side thereof to the upper elastic member 7150 and coupled at the lower side thereof to the base 7210, the printed circuit board 7250, or a circuit member 7231. The support member may support the bobbin 7110 and the housing 7140 so as to be movable in the second direction and/or the third direction, which are orthogonal to the first direction, and may be electrically connected to the first coil 7120.

Since the support member 7220 according to the embodiment is disposed on the outer side surface of each corner of the housing 7140, a total of four support members may be provided in a symmetrical arrangement. In addition, the support member 7220 may be electrically connected to the upper elastic member 7150. That is, for example, the support member 7220 may be electrically connected to a portion of the upper elastic member 7150 in which a through-hole is formed.

In addition, since the support member 7220 is formed separately from the upper elastic member 7150, the support member 7220 and the upper elastic member 7150 may be electrically connected to each other using a conductive adhesive, a solder, or the like. Thus, the upper elastic member 7150 may apply current to the first coil 7120 via the support member 7220, which is electrically connected thereto.

The support member 7220 may be connected to the printed circuit board 7250 through holes formed in the circuit member 7231 and the printed circuit board 7250. Alternatively, no holes may be formed in the circuit member 7231 and/or the printed circuit board 7250, and the support member 7220 may be electrically soldered to a corresponding portion of the circuit member 7231.

Meanwhile, FIG. 21 illustrates the linear support member 7220 according to an embodiment, but the disclosure is not limited thereto. That is, the support member 7220 may be a plate-shaped member, for example.

A second coil 7230 may move the housing 7140 in the second direction and/or the third direction via electromagnetic interaction with the first magnet 7130, thereby being capable of performing hand-tremor compensation.

Here, the second and third directions may include not only the x-axis direction (or the first direction) and the y-axis direction (or the second direction) but also the directions substantially close to the x-axis and y-axis directions. That is, the housing 7140 may move in directions parallel to the x-axis and the y-axis when viewed in terms of driving in the embodiment, but may move in directions slightly oblique to the x-axis and the y-axis when moving while being supported by the support member 7220.

Thus, it may be necessary to provide the first magnet 7130 at a position that corresponds to the second coil 7230.

The second coil 7230 may be disposed so as to face the first magnet 7130 fixed to the housing 7140. In an embodiment, the second coil 7230 may be disposed outside the first magnet 7130. Alternatively, the second coil 7230 may be downwardly spaced apart from the first magnet 7130 by a predetermined distance.

According to the embodiment, a total of four second coils 7230 may be provided respectively on four corner portions of the circuit member 7231, without being limited thereto. Only two second coils may be provided respectively in the second direction and in the third direction, or more than four second coils may be provided.

Alternatively, a total of six second coils, which include one on a first side in the second direction, two on a second side in the second direction, one on a third side in the third direction, and two on a fourth side in the third direction, may be disposed. In this case, the first side and the fourth side may be next to each other, and the second side and the third side may be next to each other.

In the embodiment, the circuit member 7231 may be formed with a circuit pattern that takes the form of the second coil 7230, and a separate second coil may be additionally disposed above the circuit member 7231, without being limited thereto. A circuit pattern that takes the form of the second coil 7230 may be formed above the circuit member 7231.

Alternatively, the second coil 7230 may be configured by winding a wire in a doughnut shape, or may be formed to have an FP coil shape, so as to be electrically connected to the printed circuit board 7250.

The circuit member 7231 including the second coil 7230 may be provided or disposed on the upper surface of the printed circuit board 7250, which is disposed above the base 7210. However, the disclosure is not limited thereto, and the second coil 7230 may be disposed in close contact with the base 7210, or may be spaced apart from the base by a predetermined distance. Alternatively, the second coil may be formed on a separate board so that the board may be stacked on and connected to the printed circuit board 7250.

The printed circuit board 7250 may be electrically connected to at least one of the upper elastic member 7150 and the lower elastic member 7160, may be coupled to the upper surface of the base 7210, and as illustrated in FIG. 21, may be formed with a through-hole at a position that corresponds to the end of the support member 7220 so that the support member 7220 is inserted into the through-hole. Alternatively, the printed circuit board may be electrically connected to and/or bonded to the support member without a through-hole.

A terminal 7251 may be disposed or formed on the printed circuit board 7250. In addition, the terminal 7251 may be disposed on the bent terminal surface 7253. A plurality of terminals 7251 may be disposed on the terminal surface 7253, and may supply current to the first coil 7120 and/or the second coil 7230 upon receiving an external voltage. The number of terminals formed on the terminal surface 7253 may be increased or reduced based on the constituent elements that need to be controlled. In addition, the printed circuit board 7250 may include one terminal surface 7253, or three or more terminal surfaces.

The cover member 7300 may have a substantially box shape, may accommodate, for example, the movable unit described above, the second coil 7230, and a portion of the printed circuit board 7250 therein, and may be coupled to the base 7210. The cover member 7300 may protect, for example, the movable unit, the second coil 7230, and the printed circuit board 7250, which are accommodated therein, and more particularly, may limit outward leakage of an electromagnetic field, which is created by, for example, the first magnet 7130, the first coil 7120, the second coil 7230 therein, thereby enabling the electromagnetic field to be focused.

Figure 22:
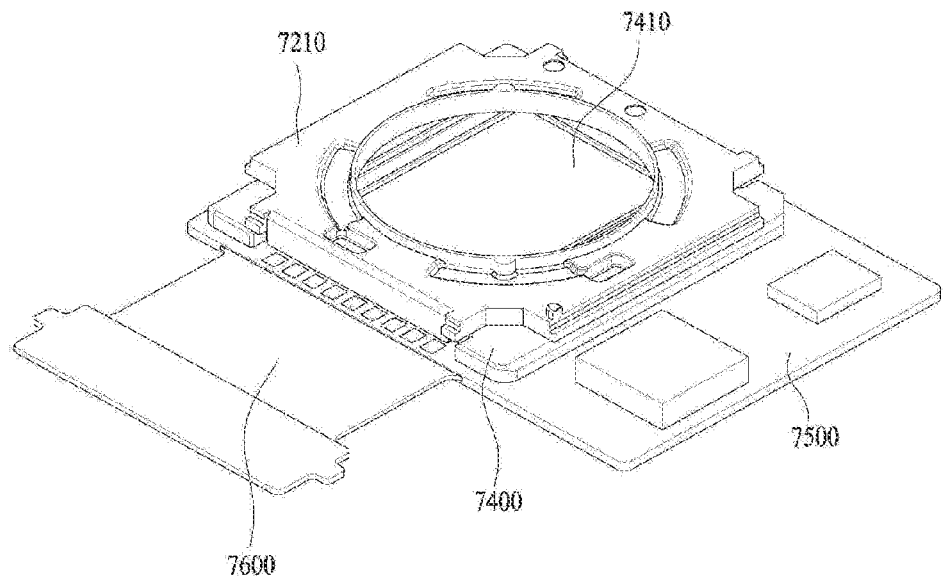
FIG. 22 is a perspective view illustrating a base, a filter holder, and a sensor holder according to an embodiment.
Figure 23:
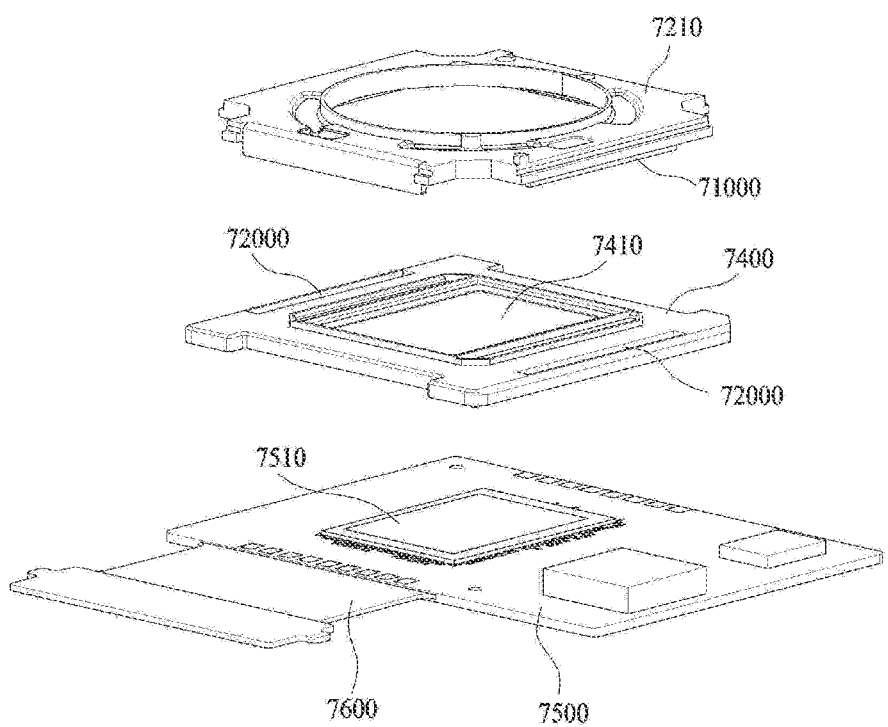
FIG. 23 is an exploded perspective view illustrating the base, the filter holder, and the sensor holder according to the embodiment.

FIG. 22 is a perspective view illustrating the base 7210, the filter holder 7400, and the sensor holder 7500 according to an embodiment. FIG. 23 is an exploded perspective view illustrating the base 7210, the filter holder 7400, and the sensor holder 7500 according to the embodiment.

The filter 7410 may be mounted in the filter holder 7400. The filter 7410 may be mounted in the filter holder 7400 at a position at which it faces the lens barrel and an image sensor 7510 in the first direction. The filter 7410 may filter light within a specific wavelength range of incident light directed through the lens barrel, and the light, which has passed through the filter 7410, may be incident on the image sensor 7510.

Here, the filter 7410 may be, for example, an infrared filter that inhibits infrared light from being incident on the image sensor 7510. The image sensor 7510 may be mounted on the upper surface of the sensor holder 7500, and the light, which has passed through the filter 7410, may be incident on the image sensor so that an image is formed thereon.

The sensor holder 7500 may be formed of a flexible material or a hard material. However, in order to allow the connection board 7600, which is electrically connected to the sensor holder 7500, to be easily connected to external devices and the camera module, the sensor holder may be formed of a flexible material that is easily changed in position.

The base 7210 and the filter holder 7400 may be, for example, adhered to each other using an adhesive such as epoxy. However, the adhered portion in which the base 7210 and the filter holder 7400 are coupled to each other may be vulnerable to shear force applied from the outside.

That is, when external force is applied to the base 7210 and the filter holder 7400 in different directions in the x-y plane, shear force may be applied to the adhered portion, and when this shear force is repeatedly and continuously applied, the adhered portion may be damaged.

When the adhered portion is damaged by the shear force, the lens barrel and the image sensor 7510 may be moved from designed positions thereof in the x-y plane. Thereby, the focus alignment of the lens barrel and the image sensor 7510 may be broken, causing remarkable deterioration in the quality of an image captured by the camera module.

In addition, when the shear force is repeatedly and continuously applied to the adhered portion, the coupling of the base 7210 and the filter holder 7400 may be broken. Thereby, the lens driving device 7100 including the base 7210 may be separated from the filter holder 7400, which may cause malfunction of the camera module.

Accordingly, in the camera module of the embodiment, the adhered portion of the base 7210 and the filter holder 7400 may have a structure capable of withstanding strong shear force.

In the camera module of the embodiment, the adhered portion may have the following structure so as to withstand strong shear force without breakage.

As illustrated in FIG. 23, the adhered portion of the base 7210 and the filter holder 7400 may be formed with an uneven structure. That is, the base 7210 may be formed with a protruding portion and an indented portion, and the filter holder 7400 may have a shape that corresponds to the base 7210.

For example, the base 7210 may be formed with a protruding portion 71000, and the filter holder 7400 may have a shape that corresponds to the base 7210, i.e. may be formed with an indented portion 72000. Here, the protruding portion 71000 may be formed on the bottom of the base 7210, and the indented portion 72000 may be formed in the top of the filter holder 7400.

Figure 24:
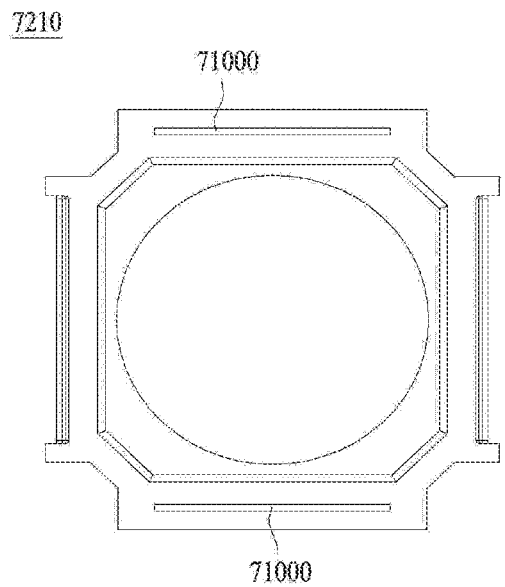
FIG. 24 is a bottom view illustrating the base according to an embodiment.
Figure 25:
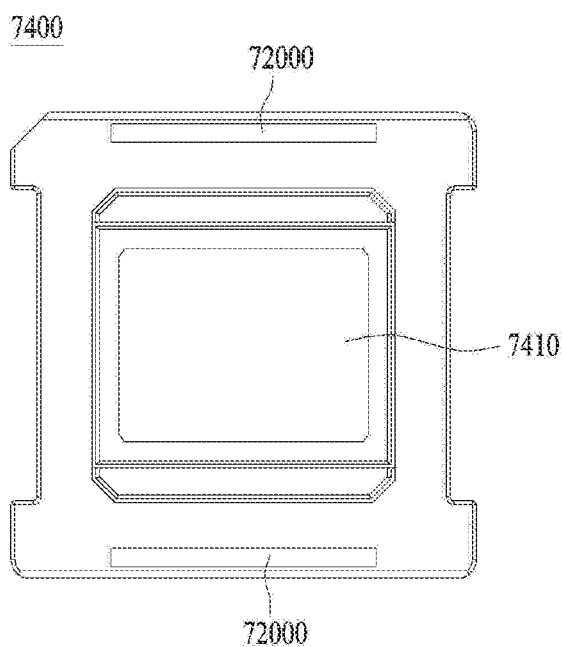
FIG. 25 is a plan view illustrating the filter holder according to an embodiment.

FIG. 24 is a bottom view illustrating the base 7210 according to an embodiment. FIG. 25 is a plan view illustrating the filter holder 7400 according to an embodiment. As illustrated in FIGS. 23 to 25, the protruding portion 71000 may take the form of a pair of bars, which are provided on respective sides of the base 7210 and are symmetrical to each other about the center of the base 7210.

Here, the indented portion (7 bosses (71100)0) may be provided in the filter holder 7400 in a shape, position, and number that correspond to those of the protruding portion 71000. Thus, in order to correspond to the protruding portion 71000 illustrated in FIG. 24, the indented portion 72000, as illustrated in FIG. 25, may include a pair of indented portions, which are provided on respective sides of the filter holder 7400 and are symmetrical to each other about the center of the filter holder 7400.

Each of the protruding portion 71000 and the indented portion 72000 is illustrated as being provided in a pair in FIGS. 23 and 24, without being limited thereto. For example, a pair of protruding portions 71000 and a pair of indented portions 72000 may be arranged in the vertical direction as illustrated in FIGS. 23 and 24, or may be provided in the horizontal direction on the base 7210 and the filter holder 7400.

In addition, based on the drawing, a total of two pairs may be provided respectively in the vertical direction and the horizontal direction. In addition, the protruding portion 71000 and the indented portion 72000 may not be continuous and singular, but may include a plurality of smaller ones spaced apart from each other.

However, regardless of the shape thereof, the protruding portion 71000 and the indented portion 72000 may have the same shape and the same number at corresponding positions.

An adhesive material PP may be applied to the adhered portion including the protruding portion 71000 and the indented portion 72000. Through the curing of the adhesive material PP, the base 7210 formed with the protruding portion 71000 and the filter holder 7400 formed with the indented portion 72000 may be coupled to each other.

With the structure described above, in the camera module in which the base 7210 and the filter holder 7400 are coupled to each other, even when external force is applied in different directions in the x-y plane to the base 7210 and the filter holder 7400 so that shear force is applied to the adhered portion, movement of the protruding portion 71000 in the x-y plane may be limited by the indented portion.

Accordingly, excessive movement of the base 7210 relative to the filter holder 7400 in the x-y plane may be limited by the protruding portion 71000 and the indented portion, and therefore, it is possible to inhibit damage to or breakage of the adhered portion by shear force.

In this way, it is possible to inhibit deterioration in the quality of an image captured by the camera module caused by excessive movement of the base 7210 relative to the filter holder 7400, and to inhibit erroneous operation and operation stoppage of the camera module due to damage to or breakage of the adhered portion.

Figure 26:
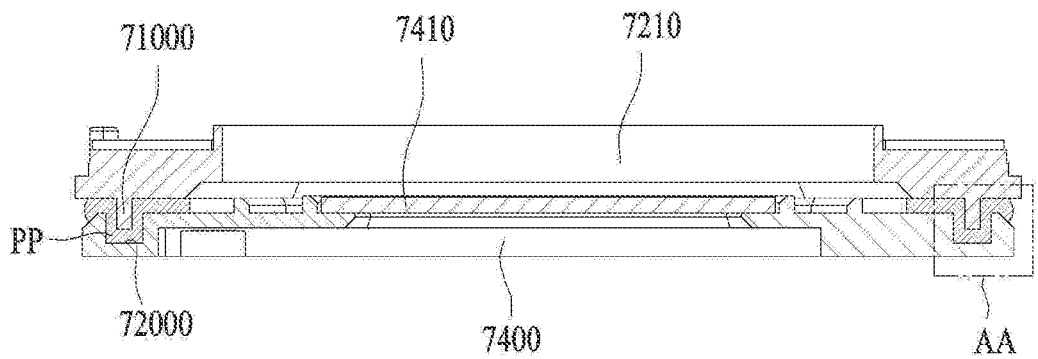
FIG. 26 is a side cross-sectional view illustrating the state in which the base and the filter holder are coupled to each other according to an embodiment.
Figure 27:
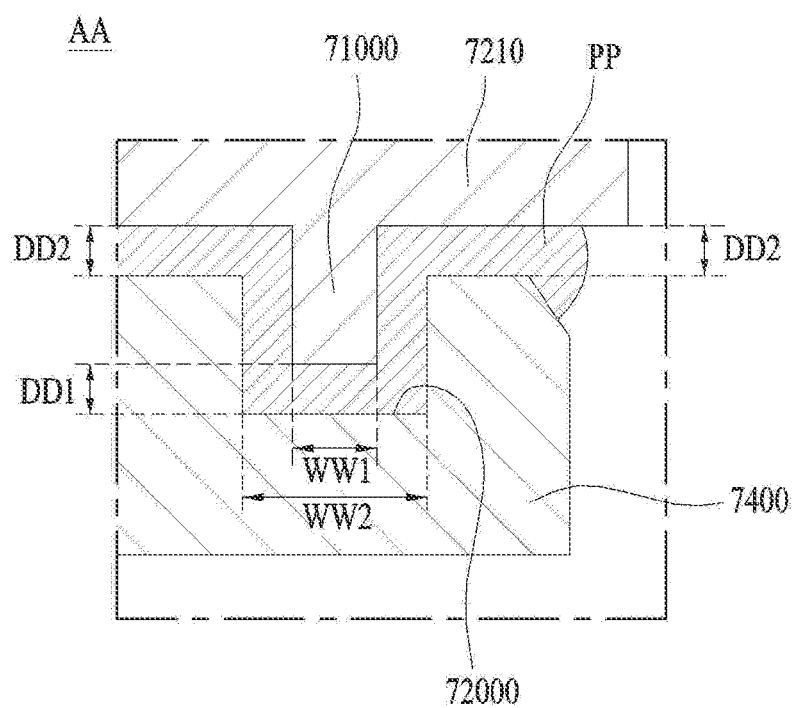
FIG. 27 is an enlarged view illustrating portion "AA" of FIG. 26.

FIG. 26 is a side cross-sectional view illustrating the state in which the base 7210 and the filter holder 7400 are coupled to each other according to an embodiment. FIG. 27 is an enlarged view illustrating portion "AA" of FIG. 26.

As illustrated in FIGS. 26 and 27, the adhesive material PP may be applied to the adhered portion of the base 7210 and the filter holder 7400 including the protruding portion 71000 and the indented portion 72000 so that the base 7210 and the filter holder 7400 are coupled to each other by adhesion.

Here, in the adhered portion, a first distance DD1, which is defined as the distance between the lower surface of the protruding portion 71000 and the bottom surface of the indented portion 72000, may range, for example, from 20 μm to 150 μm, more appropriately from 30 μm to 120 μm, and still more appropriately from 50 μm to 100 μm.

In addition, a second distance DD2, which is defined as the distance between an adhered portion of the base 7210 excluding the protruding portion 71000 and an adhered portion of the filter holder 7400 excluding the indented portion 72000, may range, for example, from 20 μm to 150 μm, more appropriately from 30 μm to 120 μm, and still more appropriately from 50 μm to 100 μm.

The reason why the first distance DD1 and the second distance DD2 are provided is to perform an active alignment process of coupling the lens driving device 7100 and the filter holder 7400 to each other.

That is, after the lens driving device 7100 is separately assembled, and then the filter holder 7400 and the sensor holder 7500 are separately assembled, the lens driving device 7100 is coupled to the filter holder 7400. When the lens driving device 7100 is coupled to the filter holder 7400, it is necessary to adjust a focal length in the first direction between a lens provided in the lens driving device 7100 and the image sensor 7510 mounted on the sensor holder 7500. This may be performed through the active alignment process.

When performing the active alignment process, the focal length is adjusted to suit to a designed value while moving the lens driving device 7100 including the base 7210 in the first direction relative to the coupled assembly of the filter holder 7400 and the sensor holder 7500.

In order to adjust the focal length as described above, an engineering margin may be required between the base 7210 and the filter holder 7400. The first distance DD1 and the second distance DD2 may serve as the engineering margin.

Meanwhile, since the engineering margin for the adjustment of the focal length may be consistent in the first direction, the first distance DD1 and the second distance DD2 may be equally set.

When the focal length is completely adjusted via the active alignment process, the base 7210 and the filter holder 7400 may be adhered to each other. Thus, after completion of the active alignment process, a space defined by the first distance DD1 and the second distance DD2 is filled with the adhesive material PP, and when the adhesive material PP is cured, the lens driving device 7100 including the base 7210 and the coupled assembly of the filter holder 7400 and the sensor holder 7500 may be coupled to each other. Here, the adhesive material PP may be, for example, epoxy.

Meanwhile, although not illustrated, instead of being applied to a portion close to the protruding portion 71000 and the indented portion 72000, the adhesive material PP may be applied to other portions close to the base 7210 and the filter holder 7400, for example, to the side surface of the base 7210, the side surfaces of the filter holder 7400 and the sensor holder 7500, and the upper surface of the sensor holder 7500.

This serves to realize firmer coupling between the lens driving device 7100 and the coupled assembly of the filter holder 7400 and the sensor holder 7500.

Meanwhile, as illustrated in FIG. 27, a second width WW2, which is defined as the width of the indented portion 72000, may be larger than a first width WW1, which is defined as the width of the protruding portion 71000. Here, the difference between the second width WW2 and the first width WW1 may range, for example, from 80 μm to 170 μm, and more appropriately from 100 μm to 150 μm.

This structure serves to allow the lens driving device to be disposed at a designed position in the x-y plane relative to the coupled assembly of the filter holder 7400 and the sensor holder 7500 during the active alignment process.

That is, in order to dispose the lens driving device at a designed position in the x-y plane relative to the coupled assembly of the filter holder 7400 and the sensor holder 7500, during the active alignment process, it may be necessary to move the lens driving device 7100 in the x-y plane. To this end, the engineering margin may be required between the protruding portion 71000 and the indented portion 72000. A width, which is measured as the difference between the second width WW2 and the first width WW1, may serve as the engineering margin.

Similar to the above description, the space defined by the width, which is measured as the difference between the second width WW2 and the first width WW1, is filled with the adhesive material PP, and when the adhesive material is cured, the lens driving device 7100 may be coupled to the coupled assembly of the filter holder 7400 and the sensor holder 7500.

Figure 28:
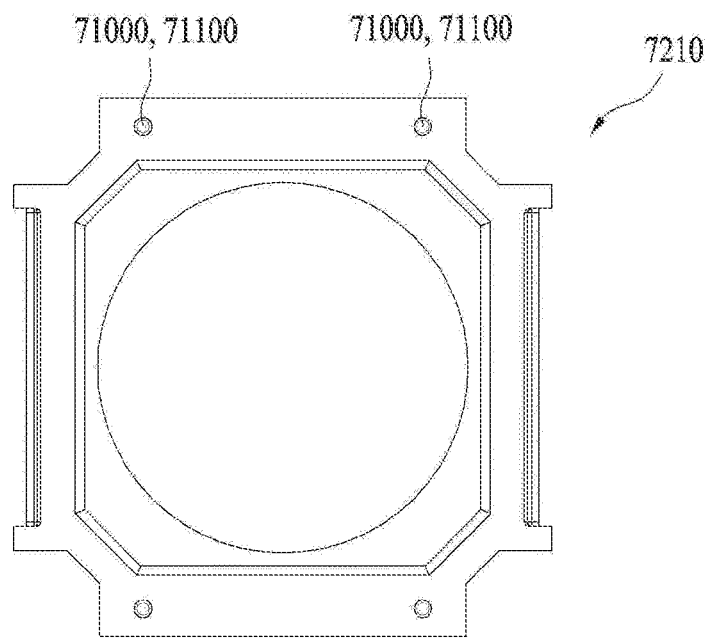
FIG. 28 is a bottom view illustrating the base according to another embodiment.
Figure 29:
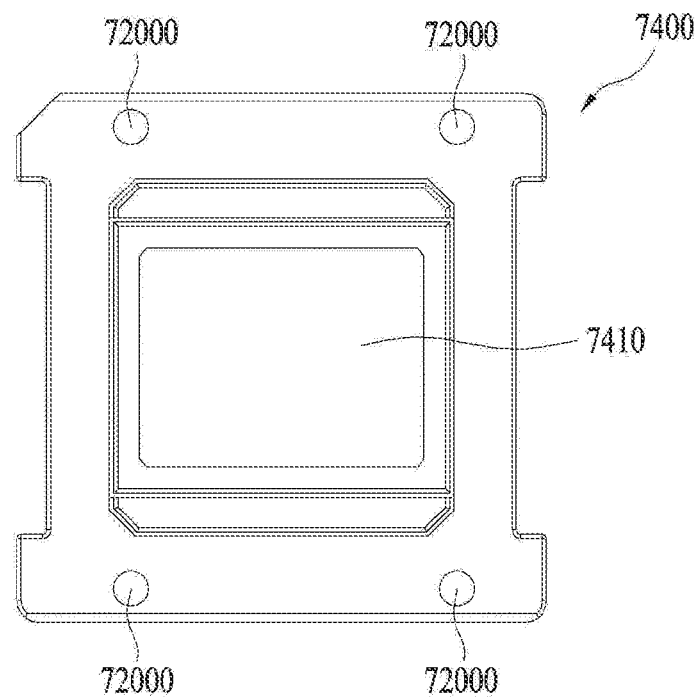
FIG. 29 is a plan view illustrating the filter holder according to the embodiment.

FIG. 28 is a bottom view illustrating the base 7210 according to another embodiment. FIG. 29 is a plan view illustrating the filter holder 7400 according to the embodiment.

As illustrated in FIG. 28, the protruding portion 71000 may include a plurality of bosses 71100. For example, the bosses 71100 may be provided on the lower surface of the base 7210, and the number and position thereof may be appropriately selected based on the size and shape of the base 7210 and the filter holder 7400.

Although FIG. 28 illustrates the bosses 71100 as having a circular cross-sectional shape, in another embodiment, each of the bosses may have a semi-circular, curvilinear, or polygonal cross-sectional shape.

The indented portion 72000 may be provided in the filter holder 7400 in a shape, position, and number that correspond to those of the bosses 71100. Here, the cross-sectional area of the indented portion 72000 may be larger than the cross-sectional area of the bosses 71100.

As described above, this serves to secure the engineering margin that is required in order to dispose the lens driving device 7100 at a designed position in the x-y plane relative to the coupled assembly of the filter holder 7400 and the sensor holder 7500 during the active alignment process of coupling the lens driving device 7100 to the coupled assembly of the filter holder 7400 and the sensor holder 7500.

In addition, as described above, during the active alignment process, the length of the boss 71100 in the first direction may be appropriately smaller than the depth of the indented portion 72000 in the first direction in order to adjust the focal length in the first direction.

Meanwhile, although not illustrated, in another embodiment, the protruding portion 71000 may be formed on the top of the filter holder 7400, and the indented portion 72000 may be formed in the bottom of the base 7210.

This is the same as or extremely similar to the structure described with reference to FIGS. 22 to 29 except that the element formed with the protruding portion 71000 and the element formed with the indented portion 72000 are reversed. Thus, a repeated description of the concrete structure will be omitted.

Figure 30:
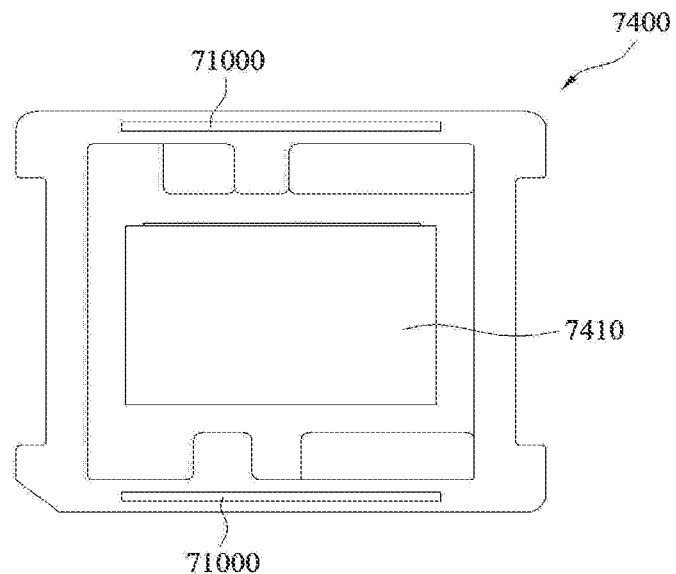
FIG. 30 is a bottom view illustrating the filter holder according to still another embodiment.
Figure 31:
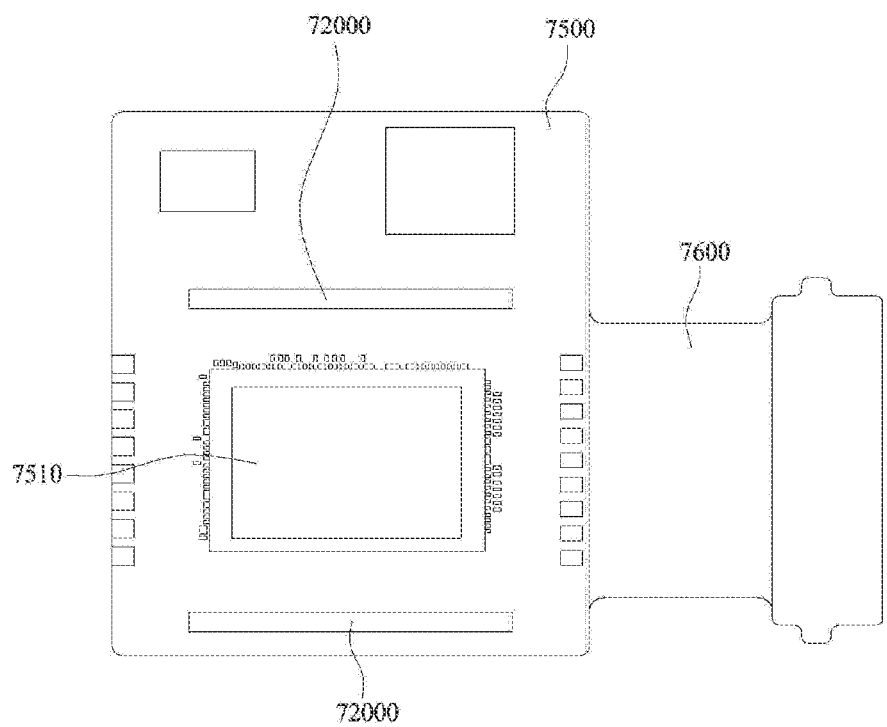
FIG. 31 is a plan view illustrating the sensor holder according to the embodiment.

FIG. 30 is a bottom view illustrating the filter holder 7400 according to still another embodiment. FIG. 31 is a plan view illustrating the sensor holder 7500 according to the embodiment.

In the embodiment, the adhered portion of the filter holder 7400 and the sensor holder 7500 may be configured such that the protruding portion or the indented portion is formed in the filter holder 7400 and the sensor holder 7500 may have a shape that corresponds to that of the filter holder 7400.

In the embodiment, as illustrated in FIGS. 30 and 31, the protruding portion 71000 is formed on the lower surface of the filter holder 7400, and the indented portion 72000 may be formed in the upper surface of the sensor holder 7500 in a position, shape, and number that correspond to those of the protruding portion 71000.

When the protruding portion 71000 and the indented portion 72000 corresponding thereto are formed on the adhered portion of the filter holder 7400 and the sensor holder 7500, it is possible to inhibit damage to or breakage of the adhered portion even when strong shear force is applied to the adhered portion of the filter holder 7400 and the sensor holder 7500.

Accordingly, it is possible to inhibit, for example, deterioration in the quality of an image, erroneous operation, and operation stoppage of the camera module due to breakage of the adhered portion of the filter holder 7400 and the sensor holder 7500.

Meanwhile, similar to the description made with reference to FIGS. 22 to 29, the protruding portion 71000 may include the plurality of bosses 71100 each having a circular, semi-circular, curvilinear, or polygonal cross-sectional shape, and the indented portion 72000 may be provided in a shape, position, and number that correspond to those of the bosses 71100.

In addition, the bosses 71100 may be formed on the sensor holder 7500, and the indented portion 72000 may be formed in the filter holder 7400 in a shape, position, and number that correspond to those of the bosses 71100.

Meanwhile, in the case in which the protruding portion 71000 or the indented portion 72000 is formed in the sensor holder 7500, the sensor holder 7500 may be formed of a hard material since the protruding portion 71000 or the indented portion 72000 needs to resist deformation.

Here, the hard sensor holder 7500 may be formed of high-temperature co-fired ceramic (HTCC), for example.

Here, the entire sensor holder 7500 may not be formed of a hard material, but at least the adhered portion needs to be formed of a hard material. Thus, at least the adhered portion of the sensor holder 7500 may be formed of high-temperature co-fired ceramic, for example.

Figure 32:
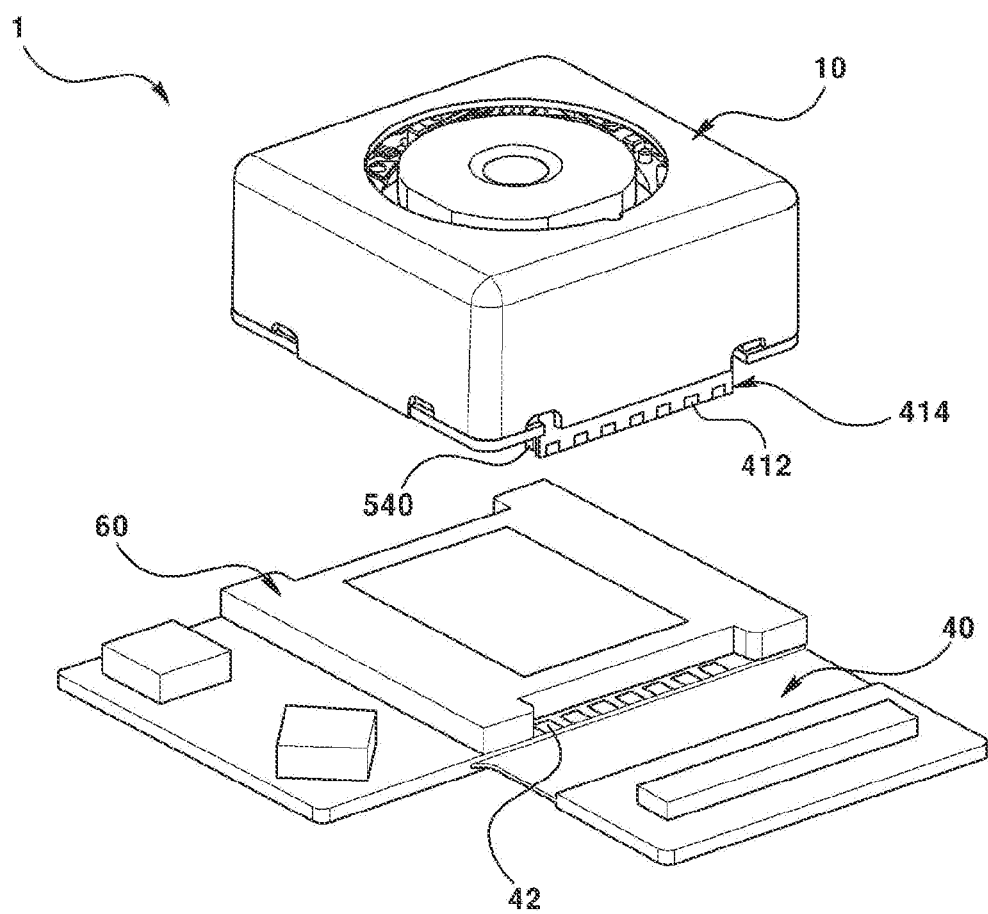
FIG. 32 is an exploded perspective view illustrating a camera module according to still another embodiment.
Figure 33:
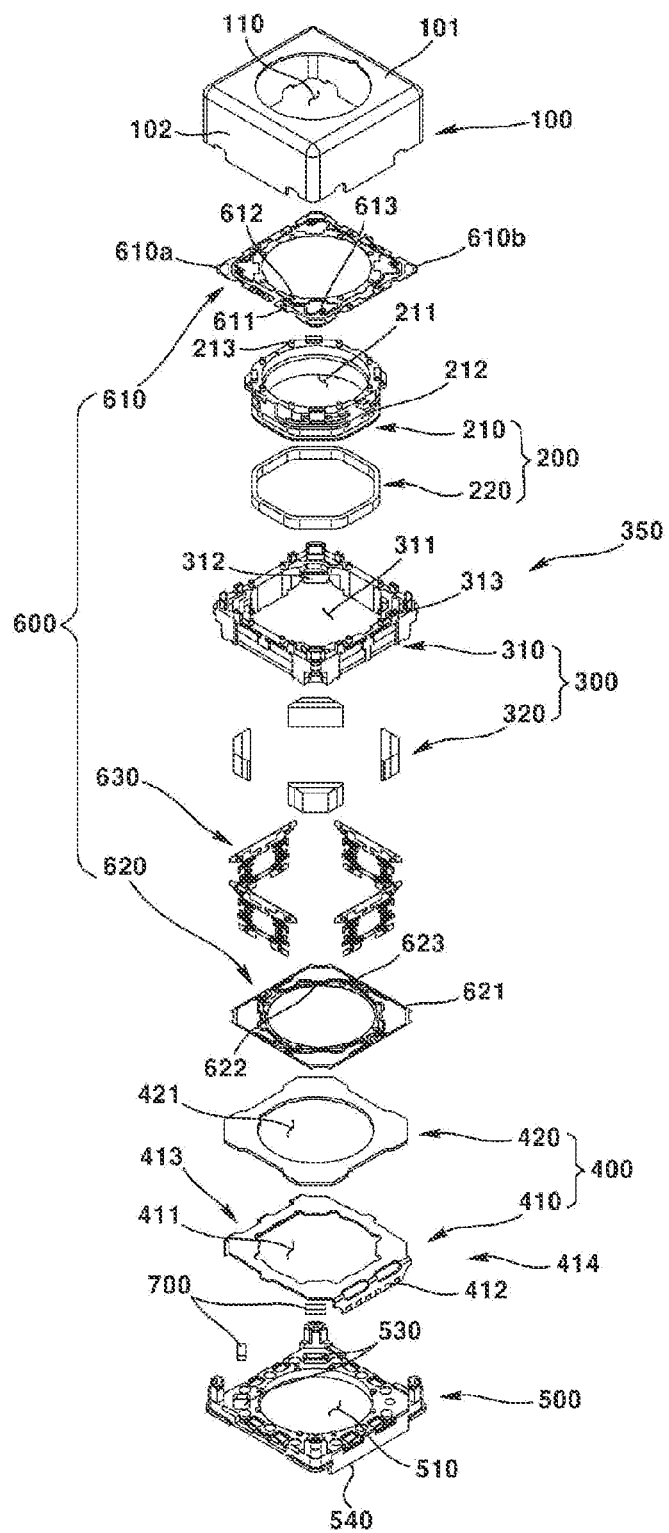
FIG. 33 is an exploded perspective view illustrating a lens driving device of FIG. 32.

FIG. 32 is an exploded perspective view illustrating a camera module according to still another embodiment. FIG. 33 is an exploded perspective view illustrating a lens driving device of FIG. 32.

Referring to FIG. 32, the camera module 1 may be any one of a mobile phone, a smartphone, a portable smart device, a digital camera, a laptop computer, a digital broadcasting terminal, a Personal Digital Assistant (PDA), a Portable Multimedia Player (PMP), and a navigation tablet PC, but not limited hereto. Any kind of device for capturing a picture or motion picture may be possible.

Referring to FIG. 32, the camera module 1 may include a lens driving device 10, a lens module (not illustrated), an infrared cutoff filter 30, a printed circuit board 40, an image sensor 50, a holder member 60, and a controller (not illustrated).

Hereinafter, the lens driving device will be described with reference to FIG. 33.

Referring to FIG. 33, the lens driving device 10 according to the embodiment may include a cover member 100, a mover 350 including a first mover 200 and a second mover 300, a stator 400, a base 500, a support member 600, and a sensing unit 700.

However, in the lens driving device 10 according to the embodiment, one or more of the cover member 100, the first mover 200, the second mover 300, the stator 400, the base 500, the support member 600, and the sensing unit 700 may be omitted.

The cover member 100 may define the external appearance of the lens driving device 10. The cover member 100 may take the form of a hexahedron, the lower portion of which is open, but not limited thereto.

The cover member 100 may include an upper surface 101 and a side surface 102 extending downwards from the outer rim of the upper surface 101.

Meanwhile, the cover member 100 may be mounted on the top of the base 500.

The first mover 200, the second mover 300, the stator 400, and the support member 600 may be located in the inner space defined by the cover member 100 and the base 500.

In addition, the cover member 100 may be mounted on the base 500 such that the inner side surface thereof is in close contact with a part or the entirety of a side surface portion of the base 500, which will be described below. Through this structure, the cover member 100 may function to protect inner constituent elements from external shocks and to inhibit the introduction of outside contaminants.

In an embodiment, the cover member 100 may be formed of a metal. More specifically, the cover member 100 may be formed of a metal board. In this case, the cover member 100 may inhibit radio frequency interference.

That is, the cover member 100 may inhibit radio waves generated outside the lens driving device 10 from being introduced into the cover member 100. In addition, the cover member 100 may inhibit radio waves generated inside the cover member 100 from being discharged to the outside of the cover member 100. However, the material of the cover member 100 is not limited thereto.

The cover member 100 may include an opening 110, which is formed in the upper surface 101 to expose the lens module. The opening 110 may have a shape that corresponds to that of the lens module.

That is, light introduced through the opening 110 may pass through the lens module. Meanwhile, the light, which has passed through the lens module, may be transmitted to the image sensor.

The first mover 200, which constitutes the mover 350, may include a bobbin 210 and a first drive unit 220.

The first mover 200 may be coupled to the lens module, which is a constituent element of the camera module 1 illustrated in FIG. 32. However, the lens module may also be described as a constituent element of the lens driving device 10.

That is, the lens module may be located inside the first mover 200. In other words, the outer peripheral surface of the lens module may be coupled to the inner peripheral surface of the first mover 200.

Meanwhile, the first mover 200 may be integrally moved with the lens module via interaction with the second mover 300, which also constitutes the mover 350. That is, the first mover 200 may move the lens module.

The first mover 200 may include the bobbin 210. In addition, the first mover 200 may include the first drive unit 220 coupled to the bobbin 210.

The bobbin 210 may be coupled to the lens module. More specifically, the outer peripheral surface of the lens module may be coupled to the inner peripheral surface of the bobbin 210. Meanwhile, the first drive unit 220 may be coupled to the bobbin 210. In addition, the lower portion of the bobbin 210 may be coupled to a lower support member 620 and the upper portion of the bobbin 210 may be coupled to an upper support member 610. The bobbin 210 may be located inside a housing 310. The bobbin 210 may move relative to the housing 310.

The bobbin 210 may include a lens coupling portion 211 formed therein. The lens module may be coupled to the lens coupling portion 211. A screw-thread may be formed in the inner peripheral surface of the lens coupling portion 211 so as to correspond to a screw-thread formed in the outer peripheral surface of the lens module. That is, the outer peripheral surface of the lens module may be screwed to the inner peripheral surface of the lens coupling portion 211.

The bobbin 210 may include a sensor guide portion (not illustrated) to which an auto-focusing feedback sensor (not illustrated) is coupled. The auto-focusing feedback sensor coupled to the sensor guide portion may sense a second drive unit 320, which is mounted on the housing 310 and is integrally moved with the bobbin 210, thereby sensing movement of the bobbin 210. In one example, the auto-focusing feedback sensor may be a hall sensor, and the second drive unit 320 may be a magnet.

The bobbin 210 may include a first drive unit coupling portion 212, around which the first drive unit 220 is wound or mounted. The first drive unit coupling portion 212 may be integrally formed on the outer side surface of the bobbin 210. In addition, the first drive unit coupling portion 212 may be continuously formed, or may be embodied as multiple parts spaced apart from each other by a predetermined distance along the outer side surface of the bobbin 210. The first drive unit coupling portion 212 may include a recess formed in a portion of the outer side surface of the bobbin 210. The first drive unit 220 may be located on the first drive unit coupling portion 212. The first drive unit 220 located on the first drive unit coupling portion 212 may be supported by a support portion protruding outward from the lower side of the recess.

The bobbin 210 may include an upper coupling portion 213 coupled to the upper support member 610. The upper coupling portion 213 may be coupled to an inner side portion 612 of the upper support member 610. In one example, the upper coupling portion 213, which takes the form of a protrusion, may be inserted into and coupled to a recess or a hole in the inner side portion 612. Unlike this, the upper support member 610 may include a protrusion and the bobbin 210 may include a recess so that the two are coupled to each other. The bobbin 210 may further include a lower coupling portion (not illustrated) coupled to the lower support member 620. The lower coupling portion formed on the lower portion of the bobbin 210 may be coupled to an inner side portion 622 of the lower support member 620. In one example, the lower coupling portion, which takes the form of a protrusion, may be inserted into and coupled to a recess or a hole in the inner side portion 622.

The first drive unit 220 may be located so as to face the second drive unit 320 of the second mover 300. The first drive unit 220 may move the bobbin 210 relative to the housing 310 via electromagnetic interaction with the second drive unit 320. The first drive unit 220 may include a coil. The coil may be guided by the first drive unit coupling portion 212 and wound around the outer side surface of the bobbin 210. In another embodiment, four coils may be independently disposed on the outer side surface of the bobbin 210 such that two neighboring coils have an angle of 90 degrees therebetween. In the case in which the first drive unit 220 includes the coils, a voltage may be supplied to the coils through the upper support member 610. Here, the upper support member 610 may be divided into a pair of members in order to supply a voltage to the respective coils. Meanwhile, the first drive unit 220 may include a pair of lead wires (not illustrated) for the supply of a voltage. In this case, the respective lead wires of the first drive unit 220 may be electrically coupled to a pair of upper support members 610a and 610b. When a voltage is supplied to the coils, an electromagnetic field may be created around the coils. In another embodiment, the first drive unit 220 may include a magnet. In this case, the second drive unit 320 may include a coil.

The second mover 300 may be located outside the first mover 200 so as to face the first mover 200. The second mover 300 may be supported by the base 500 located thereunder. The second mover 300 may be located in the inner space of the cover member 100.

The second mover 300 may include the housing 310 located outside the bobbin 210. In addition, the second mover 300 may include the second drive unit 320, which is located so as to face the first drive unit 220 and is fixed to the housing 310.

The housing 310 may be formed to have a shape that corresponds to the inner side surface of the cover member 100, which defines the external appearance of the lens driving device 10. In addition, the housing 310 may be formed of an insulating material and may be an injection-molded article in consideration of productivity. The housing 310 may be movable for optical image stabilization (OIS) and may be spaced apart from the cover member 100 by a constant distance. However, in an AF model, the housing 310 may be fixed on the base 500. In addition, in the AF model, the housing 310 may be omitted, and a magnet, which serves as the second drive unit 320, may be fixed to the cover member 100.

The housing 310 may be open at the upper side and the lower side thereof so that the first mover 200 is accommodated therein so as to be movable in the vertical direction. The housing 310 may include an inner space 311 therein, which is open at the upper and lower sides thereof. The first mover 200 may be movably located in the inner space 311.

That is, the inner space 311 may have a shape that corresponds to that of the first mover 200. In addition, the inner peripheral surface of the inner space 311 may be spaced apart from the outer peripheral surface of the first mover 200.

The housing 310 may include a second drive unit coupling portion 312 formed on the side surface thereof. The second drive unit coupling portion is formed to have a shape that corresponds to that of the second drive unit 320 and accommodates the second drive unit 320 therein. That is, the second drive unit coupling portion 312 may accommodate and fix the second drive unit 320. The second drive unit 320 may be fixed to the second drive unit coupling portion 312 using an adhesive (not illustrated). Meanwhile, the second drive unit coupling portion 312 may be located on the inner peripheral surface of the housing 310. This is advantageous for electromagnetic interaction between the second drive unit 320 and the first drive unit 220 located therein. In one example, the second drive unit coupling portion 312 may be open at the lower side thereof. This is advantageous for electromagnetic interaction between the second drive unit 320 and a third drive unit 420 located thereunder. In one example, four second drive unit coupling portions 312 may be provided. Each of the four second drive unit coupling portions 312 may be coupled to the second drive unit 320. Meanwhile, the four second drive unit coupling portions 312 may be disposed on the respective corner portions of the housing 310.

The upper support member 610 may be coupled to the upper portion of the housing 310, and the lower support member 620 may be coupled to the lower portion of the housing 310. The housing 310 may include an upper coupling portion 313 coupled to the upper support member 610. The upper coupling portion 313 may be coupled to an outer side portion 611 of the upper support member 610. In one example, the upper coupling portion 313, which takes the form of a protrusion, may be inserted into and coupled to a recess or a hole in the outer side portion 611. In another embodiment, the upper support member 610 may include a protrusion and the housing 310 may include a recess so that the two are coupled to each other. The housing 310 may further include a lower coupling portion (not illustrated) coupled to the lower support member 620. The lower coupling portion formed on the lower portion of the housing 310 may be coupled to an outer side portion 621 of the lower support member 620. In one example, the lower coupling portion, which takes the form of a protrusion, may be inserted into and coupled to a recess or a hole in the outer side portion 621.

The second drive unit 320 may be located so as to face the first drive unit 220 of the first mover 200. The second drive unit 320 may move the first drive unit 220 via electromagnetic interaction with the first drive unit 220. The second drive unit 320 may include a magnet. The magnet may be fixed to the second drive unit coupling portion 312 of the housing 310. In one example, the second drive unit 320, as illustrated in FIG. 33, may include four magnets, which are independently disposed such that two neighboring coils have an angle of 90 degrees therebetween.

That is, the second drive unit 320 may be equidistantly mounted on four side surfaces of the housing 310 to realize the efficient use of the inner volume. In addition, the second drive unit 320 may be disposed on four corner portions of the housing 310. Meanwhile, the second drive unit 320 may be adhered to the housing 310 using, for example, an adhesive, without being limited thereto. In another embodiment, the first drive unit 220 may include a magnet, and the second drive unit 320 may include a coil.

The stator 400 may be fixed to the base 500. The stator 400 may be located so as to face the lower side of the second mover 300. Meanwhile, the stator 400 may move the second mover 300. In addition, the stator 400 may have through-holes 411 and 421 formed in the center thereof so as to correspond to the lens module.

The stator 400 may include a circuit board 410 located between the third drive unit 420 and the base 500. In addition, the stator 400 may include the third drive unit 420 located under the second drive unit 320 so as to face the same.

The circuit board 410 may include a flexible printed circuit board. The circuit board 410 may be located between the third drive unit 420 and the base 500. Meanwhile, the circuit board 410 may supply a voltage to the third drive unit 420.

In addition, the circuit board 410 may supply a voltage to the first drive unit 220 through a lateral support member 630 and the upper support member 610.

The circuit board 410 may have therein the through-hole 411, through which light that has passed through the lens module passes.

In addition, a portion of the circuit board 410 may be bent from the side surface of the base 500 so as to protrude from the lower surface of the base 500. A terminal unit 412 may be formed on the bent portion of the circuit board 410 that protrudes from the lower surface of the base 500.

The terminal unit 412 may be electrically connected to the printed circuit board 40, which is illustrated in FIG. 32 and will be described below, and a voltage or a control signal may be applied to the circuit board 410 through the terminal unit 412.

The third drive unit 420 may include a coil. When a voltage is applied to the coil of the third drive unit 420, the second drive unit 320 and the housing 310 fixed to the second drive unit 320 may be integrally moved via interaction between the third drive unit and the second drive unit 320. The third drive unit 420 may be mounted on or electrically connected to the circuit board 410.

Meanwhile, the third drive unit 420 may have therein the through-hole 421, through which light from the lens module passes. In addition, in consideration of reduction of the size of the lens driving device 10 (a reduction in height in the z-axis direction, i.e. the optical-axis direction), the third drive unit 420 may be formed as an FP coil, which is a patterned coil, and may be disposed or mounted on the circuit board 410.

The base 500 may support the second mover 300. The printed circuit board 40 illustrated in FIG. 32 may be located below the base 500.

The base 500 may have a through-hole 510 formed at a position that corresponds to the lens coupling portion 211. The base 500 may perform a sensor holder function to protect the image sensor 50 illustrated in FIG. 32.

In an embodiment, the base 500 may include a foreign substance collection unit (not illustrated), which collects a foreign substance introduced into the cover member 100. The foreign substance collection unit may be located on the upper surface of the base 500 and may include an adhesive material to collect a foreign substance in the inner space defined by the cover member 100 and the base 500. The base 500 may include a sensor mounting portion 530 to which the sensor unit 700 is coupled.

That is, the sensor unit 700 may be mounted on the sensor mounting portion 530. Here, the sensor unit 700 may sense horizontal movement of the housing 310 by sensing the second drive unit 320 coupled to the housing 310. In one example, two sensor mounting portions 530 may be provided. The sensor unit 700 may be located on each of the two sensor mounting portions 530. In this case, the sensor unit 700 may be disposed so as to sense movement of the housing 310 in the x-axis and y-axis directions.

The support member 600 may interconnect two or more of the first mover 200, the second mover 300, and the base 500. The support member 600 may elastically interconnect two or more of the first mover 200, the second mover 300, and the base 500 to enable relative movement between the respective constituent elements. That is, the support member 600 may be an elastic member. In an embodiment, as illustrated in FIG. 33, the support member 600 may include the upper support member 610, the lower support member 620, and the lateral support member 630. Meanwhile, an electrical conduction member (not illustrated) may be provided separately from the support member 600 to electrically interconnect two or more of the upper support member 610, the lower support member 620, and the lateral support member 630.

In one example, the upper support member 610 may include the outer side portion 611, the inner side portion 612, and a connecting portion 613. The upper support member 610 may include the outer side portion 611 coupled to the housing 310, the inner side portion 612 coupled to the bobbin 210, and the connecting portion 613 configured to elastically interconnect the outer side portion 611 and the inner side portion 612.

The upper support member 610 may be connected to the upper portion of the first mover 200 and the upper portion of the second mover 300. More specifically, the upper support member 610 may be coupled to the upper portion of the bobbin 210 and the upper portion of the housing 310. The inner side portion 612 of the upper support member 610 may be coupled to the upper coupling portion 213 of the bobbin 210, and the outer side portion 611 of the upper support member 610 may be coupled to the upper coupling portion 313 of the housing 310.

In an embodiment, the upper support member 610 may be divided into a pair of members. That is, the upper support member 610 may include a first upper support member 610*a* and a second upper support member 610*b*. Here, each of the first upper support member 610*a* and the second upper support member 610*b* may be a coil, and may be connected to a corresponding one of the lead wires of the first drive unit 220 to supply a voltage. In other words, the pair of upper support members 610*a* and 610*b* may be used to apply a voltage to the first drive unit 220. In one example, the upper support member 610 may receive a voltage from the circuit board 410 through the lateral support member 630. That is, the first drive unit 220 may receive a voltage from the circuit board 410 through the lateral support member 630 and the upper support member 610.

In one example, the lower support member 620 may include the outer side portion 621, the inner side portion 622, and a connecting portion 623. The lower support member 620 may include the outer side portion 621 coupled to the housing 310, the inner side portion 622 coupled to the bobbin 210, and the connecting portion 623 configured to elastically interconnect the outer side portion 621 and the inner side portion 622.

The lower support member 620 may be connected to the lower portion of the first mover 200 and the lower portion of the second mover 300. More specifically, the lower support member 620 may be coupled to the lower portion of the bobbin 210 and the lower portion of the housing 310. The inner side portion 622 of the lower support member 620 may be coupled to the lower coupling portion of the bobbin 210, and the outer side portion 621 of the lower support member 620 may be coupled to the lower coupling portion of the housing 310.

The lateral support member 630 may have one end fixed to the stator 400 or the base 500 and the other end coupled to the upper support member 610 or the second mover 300. In one example, the lateral support member 630 may be coupled at one side thereof to the base 500 and at the other side thereof to the housing 310. In another embodiment, the lateral support member 630 may be coupled at one side thereof to the stator 400 and at the other side thereof to the upper support member 610. The lateral support member 630 may elastically support the second mover 300 relative to the base 500 so as to allow the second mover 300 to horizontally move or tilt.

In one example, the lateral support member 630 may include a leaf spring. In one example, the lateral support member 630 may include leaf springs located respectively on four outer side surfaces of the housing 310. In an embodiment, the lateral support member 630 may include a plurality of wires. Here, the number of wires may be six or eight.

In one example, the lateral support member 630 may include a constituent element, which is coupled to the upper support member 610 in order to absorb shocks. The shock-absorbing element may be provided on one of the lateral support member 630 and the upper support member 610. The shock-absorbing element may be a separate member such as a damper (not illustrated). In addition, the shock-absorbing element may be realized by changing the shape of a portion of one of the lateral support member 630 and the upper support member 610.

The sensor unit 700 may be used for any one of auto-focusing (AF) feedback and optical image stabilization (OIS) feedback. That is, the sensor unit 700 may sense the position or movement of one or more of the first mover 200 and the second mover 300. In one example, the sensor unit 700 may sense horizontal movement or tilting of the second mover 300 to provide information for OIS feedback.

The sensor unit 700 may be disposed on the stator 400. The sensor unit 700 may be located on the upper surface or the lower surface of the circuit board 410 of the stator 400. In an embodiment, the sensor unit 700 may be disposed on the lower surface of the circuit board and may be located on the sensor mounting portion 530 of the base 500. In an embodiment, the sensor unit 700 may include a hall sensor. Here, the sensor unit 700 may sense movement of the second mover 300 relative to the stator 400 by sensing the magnetic field of the second drive unit 320. In one example, more than two sensor units 700 may be provided to sense movement of the second mover 300 in both the x-axis direction and the y-axis direction.

Figure 34:
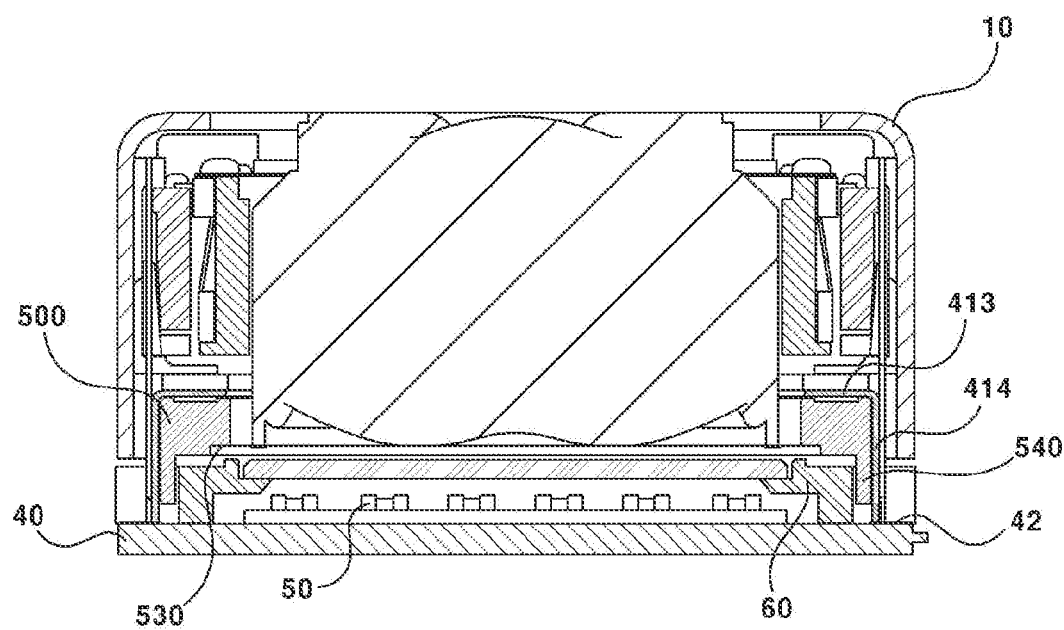
FIG. 34 is a longitudinal cross-sectional view of the remainder of the camera module excluding the lens driving device of FIG. 32.

FIG. 34 is a longitudinal cross-sectional view of the remainder of the camera module excluding the lens driving device of FIG. 32.

Referring to FIGS. 33 and 34, the circuit board 410, which include the flexible printed circuit board described above with reference to FIG. 33, includes a first circuit board portion 413 and a second circuit board portion 414.

The first circuit board portion 413 is defined as a portion that is disposed so as to face the upper surface of the base 500, and the second circuit board portion 414 is defined as a portion that is bent downward toward the side surface of the base 500 so as to protrude or extend toward the lower surface of the base 500.

The second circuit board portion 414 protrudes or extends by the first distance D1 when measured from the lower surface of the base 500. The terminal unit 412 may be formed on the second circuit board portion 414.

In the embodiment, in the case in which the first circuit board 410 includes a flexible printed circuit board, for example, the position and bending angle of the second circuit board portion 414 relative to the base 500 may not be consistent.

That is, for example, the position and bending angle of the second circuit board portion 414, which is bent along the side surface of the base 500, may differ for each camera module.

In the case in which the position and bending angle of the second circuit board portion 414, which is bent along the side surface of the base 500, differs for each camera module, it is very difficult to accurately interconnect a terminal formed on the second circuit board portion 414 and a terminal formed on the printed circuit board 40, which will be described below, and consequently, to assemble the terminal formed on the circuit board 410 and the terminal formed on the printed circuit board 40 with each other through an automated process.

In the embodiment, in order to make the position and bending angle of the second circuit board portion 414, which is bent along the side surface of the base 500, be consistent for each camera module 1, the base 500 is formed with a support portion 540 to support the second circuit board portion 414.

The support portion 540 may protrude from the lower surface of the base 500. For example, the support portion 540 may have a plate shape.

The support portion 540, which has a plate shape and protrudes from the lower surface of the base 500, may be formed to have a shape that corresponds to the second circuit board portion 414.

In addition, the support portion 540 may be formed in a direction parallel to the second circuit board portion 414 in order to be able to be in surface contact with the second circuit board portion 414.

In the embodiment, the protruding length of the support portion 540, measured from the lower surface of the base 500, is smaller than the length of the second circuit board portion 414. This serves to inhibit erroneous electrical connection between the second circuit board portion 414 and the printed circuit board 40, which is caused when the second circuit board portion 414 is spaced apart from the printed circuit board 40 since the base 500 is brought into contact with the printed circuit board 40 earlier than the second circuit board portion 414.

In the embodiment, in order to inhibit the support portion 540 and the second circuit board portion 414 from being separated from each other, the support portion 540 and the second circuit board portion 414 may be adhered to each other using an adhesive, for example.

Although the embodiment illustrates and describes the case in which one support portion 540 protrudes from the lower surface of the base 500, a plurality of support portions 540 may be formed on the lower surface of the base 500.

That is, the support portions 540 may protrude from the lower surface of the base 500, and the second circuit board portion 414 may be supported by the support portions 540.

Referring again to FIG. 32, the support portion 540 formed on the base 500 and the second circuit board portion 414 are coupled to the printed circuit board 40.

The image sensor 50 may be mounted on the printed circuit board 40.

The printed circuit board 40 may be formed with a terminal unit 42 for applying a voltage or a control signal to the lens driving device 10. The terminal unit 42 is electrically connected to the terminal unit 412 formed on the second circuit board portion 414.

A controller (not illustrated) may be formed on the printed circuit board 40 to control the lens driving device 10.

The image sensor 50 may be mounted on the printed circuit board 40. The image sensor 50 may be located so that the optical axis thereof coincides with the lens module. Thereby, the image sensor 50 may acquire light, which has passed through the lens module. The image sensor 50 may output an image using light introduced thereinto.

In an embodiment, the image sensor 50 may be a charge coupled device (CCD), a metal oxide semiconductor (MOS), a CPD, or a CID. However, the type of image sensor 50 is not limited thereto.

The holder member 60 fixes the rim of the image sensor 50 so that the image sensor 50 may be firmly fixed to the printed circuit board 40.

In the embodiment, the holder member 60 serves to protect the image sensor 50 from shocks or vibrations applied from the outside by surrounding the image sensor 50.

The holder member 60 also serves to support the lens driving device 10, in addition to fixing the rim of the image sensor 50 so as to firmly fix the image sensor 50 to the printed circuit board 40.

In addition, a wall 62 may additionally protrude from the upper surface of the holder member 60, and the infrared cutoff filter 30 may be disposed on the wall 62.

Referring to FIGS. 32 and 34, the wall 62 of the holder member 60 is disposed very close to the base 500, and thus, the wall 62 of the holder member 60 and the base 500 may come into contact with each other during a reliability test, which may cause deterioration in the performance of the camera module 1.

In order to inhibit this, an escape portion 530 may be formed on the rear surface of the base 500. For example, the escape portion 530 may take the form of a recess to inhibit the wall 62 from coming into contact with the rear surface of the base 500.

Meanwhile, in the embodiment, the outer side surface of the holder member 60 may face the support portion 540, which protrudes or extends from the base 500.

Figure 35:
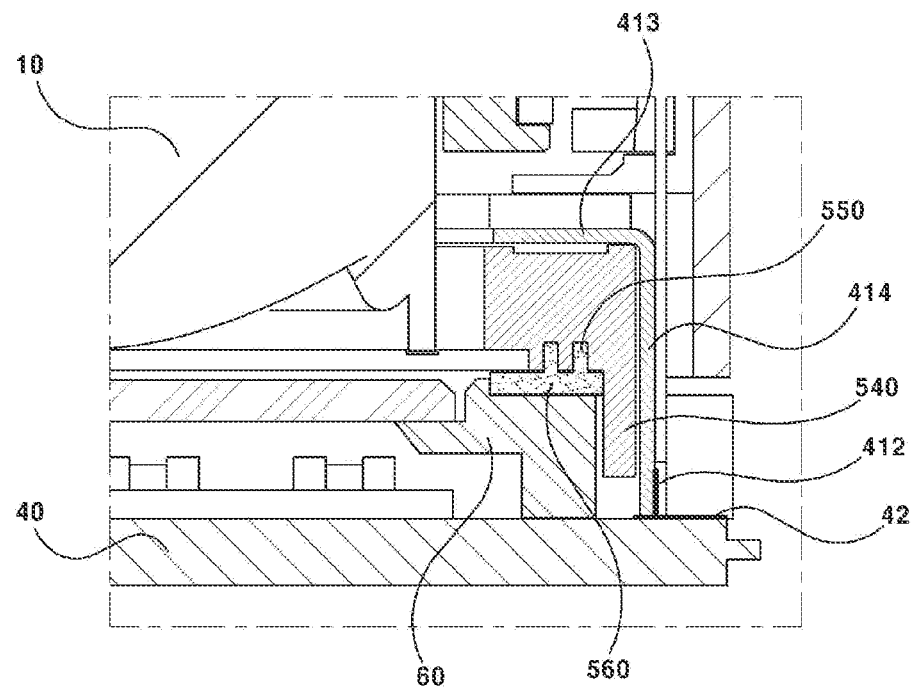
FIG. 35 is a cross-sectional view illustrating the bonding structure of the base corresponding to the holder member according to an embodiment.

FIG. 35 is a cross-sectional view illustrating the bonding structure of the base corresponding to the holder member according to an embodiment.

Referring to FIG. 35, the lens driving device 10 is bonded to the holder member 60. The lens driving device 10 and the holder member 60 are bonded together by, for example, a hybrid epoxy hardener 560, which is cured by heat and light. Unlike this, both the lens driving device 10 and the holder member 60 may be bonded by, for example, a thermosetting adhesive or a photo-curing adhesive.

In the embodiment, since the area over which the hybrid epoxy hardener is applied between the holder member 60 and the base 500 is very narrow, the lens driving device 10 and the holder member 60 may be easily separated from each other when transverse force is applied between the lens driving device 10 and the holder member 60.

In order to inhibit this, the lower surface of the base 500 may be formed with adhesive accommodating recesses 550, which are concavely formed in a direction facing the upper surface of the base 500, and the adhesive 560 is accommodated in the adhesive accommodating recesses 550.

In the embodiment, for example, the adhesive accommodating recesses 550 may be arranged in a matrix form in the lower surface of the base 500.

According to the above detailed description, the embodiments may inhibit errors in the assembly of a flexible printed circuit board and an image sensor board and may reduce the assembly time by supporting the flexible printed circuit board, which protrudes from a lens driving device and is connected to the image sensor board when the image sensor board and the lens driving device are coupled to each other.

In addition, the embodiments inhibit great deterioration in the performance of a camera module caused when the image sensor board and the lens driving device, which are bonded to each other, are brought into contact with each other at facing portions thereof during, for example, a reliability test.

In addition, it is possible to inhibit the image sensor board and the lens driving device from being easily separated from each other by external shocks due to the small size of an adhesive area of an adhesive disposed between the image sensor board and the lens driving device.

Although only a few embodiments have been described above, various other forms may be implemented. The technical contents of the embodiments described above may be combined in various forms as long as they are not incompatible technologies, and thus, may be implemented in new forms.

INDUSTRIAL APPLICABILITY

A lens driving device and a camera module including the same of the embodiments may include a fixing part between a lens barrel and a bobbin, thereby inhibiting the lens barrel from being separated from the bobbin or from tilting during a shock test. Accordingly, the lens driving device and the camera module including the same have industrial applicability.

The invention claimed is:
1. A camera module comprising:
a lens barrel;
a bobbin configured to accommodate the lens barrel therein; and
a fixing part disposed between the lens barrel and the bobbin so as to couple the lens barrel to the bobbin,
wherein the bobbin comprises an upper surface, a lower surface, and an inner side surface disposed between the upper surface and a lower surface thereof to be opposite to an outer side surface of the lens barrel,
wherein the bobbin comprises a bobbin rib protruding from the inner side surface thereof toward the outer side surface of the lens barrel,
wherein the inner side surface of the bobbin comprises an upper portion disposed between the upper surface of the bobbin and an upper end of the bobbin rib, and a lower portion disposed between the lower surface of the bobbin and a lower end of the bobbin rib,
wherein no screw-thread is formed in the upper and lower portions of the inner side surface of the bobbin,
wherein the bobbin rib comprises a first surface contacting the upper portion of the inner side surface of the bobbin, a second surface contacting the lower portion of the inner side surface of the bobbin, and a third surface connecting the first surface and the second surface,
wherein the bobbin rib protrudes from a first portion meeting the first surface and the upper portion of the inner side surface of the bobbin and a second portion meeting the second surface and the lower portion of the inner side surface of the bobbin, and
wherein the fixing part contacts the first to third surfaces of the bobbin rib.

2. The camera module according to claim 1, wherein the bobbin rib has a strip shape and the bobbin rib is provided on the inner side surface of the bobbin to have a hollow cross-sectional shape.

3. The camera module according to claim 1, wherein the lens barrel comprises an indented portion that is indented away from the bobbin, and wherein the indented portion is positioned closer to an upper surface of the lens barrel than it is to a lower surface of the lens barrel.

4. The camera module according to claim 3, wherein the indented portion is disposed above a lowermost portion of the fixing part.

5. The camera module according to claim 1, wherein the lens barrel comprises a lens barrel rib protruding radially outwards from an outer side surface thereof.

6. The camera module according to claim 5, wherein the fixing part is disposed between the bobbin rib and the lens barrel rib.

7. The camera module according to claim 1, wherein the fixing part comprises ultraviolet (UV) curing epoxy.

8. The camera module according to claim 1, wherein the fixing part comprises thermosetting epoxy.

9. The camera module according to claim 1, wherein the fixing part is coupled to a part of the upper portion of the inner side surface of the bobbin, a part of the lower portion of the inner side surface of the bobbin, and the bobbin rib.

10. The camera module according to claim 1, comprising:
a first coil disposed on an outer peripheral surface of the bobbin; and
a magnet disposed so as to face the first coil and configured to move the bobbin by an electromagnetic interaction with the first coil.

11. The camera module according to claim 10, comprising:
a housing configured to support the magnet; and
an upper elastic member coupled to the bobbin and the housing,
wherein the bobbin is disposed in the housing.

12. The camera module according to claim 11, comprising:
a second coil facing the magnet and configured to move the housing by electromagnetic interaction with the magnet; and
a support member configured to support the housing.

13. The camera module according to claim 12, comprising a circuit board electrically connected to the second coil.

14. The camera module according to claim 13, comprising a position sensor configured to sense movement of the housing.

15. The camera module according to claim 13, comprising a base disposed under the circuit board.

16. A camera module comprising:
a bobbin comprising an upper surface, a lower surface, and an inner side surface between the upper and lower surfaces thereof;

a lens barrel disposed in the bobbin and comprising an outer side surface facing the inner side surface of the bobbin;

a fixing part disposed between the outer side surface of the lens barrel and the inner side surface of the bobbin, wherein the inner side surface of the bobbin comprises:
- an upper portion meeting the upper surface of the bobbin and being flat in a first direction perpendicular to the upper surface of the bobbin;
- a lower portion meeting the lower surface of the bobbin and being flat in the first direction: and
- a bobbin rib disposed between the upper portion and the lower portion so as to protrude toward the lens barrel with respect to the upper and lower portions thereof, wherein the outer side surface of the lens barrel comprises a lens barrel rib protruding toward the bobbin rib with respect of the outer side surface thereof, and wherein the fixing part is disposed between the bobbin rib and the lens barrel rib so as to contact both the bobbin rib and the lens barrel rib.

17. The camera module according to claim 16, wherein the lens barrel comprises an indented portion that is indented away from the bobbin, and the indented portion is disposed above a lowermost portion of the fixing part and closer to an upper surface of the lens barrel than it is to a lower surface of the lens barrel.

18. The camera module according to claim 16, wherein the bobbin rib has a strip shape to have a hollow cross-sectional shape.

19. The camera module according to claim 16, wherein the bobbin rib comprises a first surface contacting the upper portion of the inner side surface of the bobbin, a second surface contacting the lower portion of the inner side surface of the bobbin, and a third surface connecting the first surface and the second surface, and
wherein the fixing part contacts the first to third surfaces of the bobbin rib.

20. A camera module comprising:
a circuit board;
an image sensor disposed on the circuit board;
a bobbin disposed to be spaced apart from the image sensor and comprising an upper surface, a lower surface, and an inner side surface between the upper and lower surfaces thereof;
a lens barrel disposed in the bobbin; and
a fixing part disposed between the lens barrel and the bobbin,
wherein the inner side surface of the bobbin comprises:
- an upper portion meeting the upper surface of the bobbin and being flat in a first direction perpendicular to the upper surface of the bobbin;
- a lower portion meeting the lower surface of the bobbin and being flat in the first direction; and
- a bobbin rib disposed between the upper portion and the lower portion so as to protrude toward the lens barrel with respect to the upper and lower portions thereof, and wherein the fixing part is configured to be in contact with the bobbin rib.

* * * * *